US012806089B2

(12) United States Patent
Cho et al.

(10) Patent No.: US 12,806,089 B2
(45) Date of Patent: Nov. 24, 2026

(54) RAMP APPARATUS FOR VEHICLE

(71) Applicants: HYUNDAI MOTOR COMPANY, Seoul (KR); Kia Corporation, Seoul (KR); PHA Co., Ltd., Daegu (KR)

(72) Inventors: Kyu Hoon Cho, Suwon-si (KR); Jae Seung Lee, Hwaseong-si (KR); Jin Pyung Park, Seoul (KR); Min Jae Lee, Hwaseong-si (KR)

(73) Assignees: Hyundai Motor Company, Seoul (KR); Kia Corporation, Seoul (KR); PHA Co., LTD., Seoul (KR)

( * ) Notice: Subject to any disclaimer, the term of this patent is extended or adjusted under 35 U.S.C. 154(b) by 562 days.

(21) Appl. No.: 18/062,296

(22) Filed: Dec. 6, 2022

(65) Prior Publication Data

US 2024/0058186 A1 Feb. 22, 2024

(30) Foreign Application Priority Data

Aug. 22, 2022 (KR) ........................ 10-2022-0105098

(51) Int. Cl.
*B60P 1/43* (2006.01)
*A61G 3/06* (2006.01)

(52) U.S. Cl.
CPC .............. *A61G 3/061* (2013.01); *B60P 1/431* (2013.01)

(58) Field of Classification Search
CPC ................................ A61G 3/061; B60P 1/431
USPC .................................................. 14/69.5–72.5
See application file for complete search history.

(56) References Cited

U.S. PATENT DOCUMENTS 3,268,932 A 8/1966 Hartman
3,516,103 A * 6/1970 Beckwith ........... B65G 69/2841 14/71.3
3,756,433 A 9/1973 Richins
4,068,770 A * 1/1978 Boehringer ............... B64C 1/22 14/71.1

(Continued)

FOREIGN PATENT DOCUMENTS

CA 2620211 A1 8/2008
CA 2630619 A1 11/2008

(Continued)

OTHER PUBLICATIONS

Brazos Manufacturing and Welding Services, "Work All Night With A Brazos Safety Lighted Ramp," https://brazosmanufacturing.com/work-all-night-with-a-brazos-safety-lighted-ramp/, Aug. 13, 2016, 4 pages.

*Primary Examiner* — Raymond W Addie
(74) *Attorney, Agent, or Firm* — Slater Matsil, LLP

(57) ABSTRACT

An embodiment is a ramp apparatus for a vehicle, the ramp apparatus including a housing mounted on a vehicle body, a ramp assembly configured to move between a stowed position in which the ramp assembly is stowed in the housing and an extended position in which the ramp assembly is extended out from the housing, wherein the ramp assembly is configured to be moved telescopically to be extended and retracted. The ramp apparatus may further include a hinge mechanism configured to allow the ramp assembly to pivot when the ramp assembly is deployed from the housing, wherein the hinge mechanism includes a moving body connected to the ramp assembly through a hinge shaft, and a hinge drive unit mounted on the moving body.

20 Claims, 37 Drawing Sheets

(56) References Cited

U.S. PATENT DOCUMENTS

| | | | | | |
|---|---|---|---|---|---|
| 4,078,678 | A * | 3/1978 | Tordella | B60P 1/431 414/537 |
| 4,670,928 | A | 6/1987 | Alten | |
| 4,685,858 | A | 8/1987 | Manning et al. | |
| 4,759,682 | A | 7/1988 | Hood | |
| 4,827,548 | A | 5/1989 | Hood | |
| 4,900,217 | A * | 2/1990 | Nelson | B60P 1/431 14/71.1 |
| 4,923,360 | A | 5/1990 | Beauchemin | |
| 5,244,335 | A | 9/1993 | Johns | |
| 5,273,335 | A * | 12/1993 | Belnap | B62D 33/0273 296/61 |
| 5,305,486 | A * | 4/1994 | Smith | A61G 3/067 14/70 |
| 5,380,144 | A * | 1/1995 | Smith | A61G 3/061 14/71.3 |
| 5,393,192 | A * | 2/1995 | Hall | B60P 1/431 296/61 |
| 5,676,515 | A | 10/1997 | Haustein | |
| 5,775,232 | A | 7/1998 | Golemis et al. | |
| 5,795,125 | A * | 8/1998 | Walkden | B60P 1/431 14/71.1 |
| 5,803,523 | A | 9/1998 | Clark et al. | |
| 5,816,767 | A * | 10/1998 | Mann | B60P 1/43 14/71.7 |
| 5,832,555 | A * | 11/1998 | Saucier | B60P 1/431 14/71.1 |
| 6,186,733 | B1 | 2/2001 | Lewis | |
| 6,190,112 | B1 | 2/2001 | Danilovic | |
| 6,409,458 | B1 | 6/2002 | Cohn | |
| 6,431,815 | B1 * | 8/2002 | Zarzecki | B60P 1/431 414/552 |
| 6,484,344 | B1 | 11/2002 | Cooper | |
| 6,802,095 | B1 * | 10/2004 | Whitmarsh | B60P 1/433 14/71.3 |
| 7,010,825 | B1 | 3/2006 | Finch Salas | |
| 7,451,512 | B2 | 11/2008 | Fullerton et al. | |
| 7,488,025 | B1 | 2/2009 | Roberson | |
| 7,913,343 | B1 * | 3/2011 | Cohn | B60P 1/433 14/71.3 |
| 8,122,553 | B1 * | 2/2012 | Johnson | B60P 1/433 14/71.3 |
| 8,327,485 | B1 * | 12/2012 | Morris | A61G 3/061 14/71.1 |
| 8,438,683 | B1 * | 5/2013 | Morris | A61G 3/067 14/71.1 |
| 8,533,884 | B1 | 9/2013 | Johnson et al. | |
| 8,631,528 | B1 | 1/2014 | Johnson | |
| 8,926,254 | B2 | 1/2015 | Pocobello | |
| 9,545,345 | B1 * | 1/2017 | Akers, Jr. | A61G 3/0272 |
| 9,719,261 | B2 | 8/2017 | Belman | |
| 9,764,674 | B2 | 9/2017 | Friesen | |
| 9,902,306 | B1 | 2/2018 | Foss | |
| 9,994,263 | B1 | 6/2018 | Richter | |
| 10,040,385 | B2 | 8/2018 | Stevens | |
| 12,336,939 | B2 | 6/2025 | Lee | |
| 2001/0005478 | A1 | 6/2001 | Lewis | |
| 2004/0013507 | A1 * | 1/2004 | Kiser | B60P 1/431 14/71.1 |
| 2004/0107520 | A1 * | 6/2004 | van der Heiden | B60P 1/4457 14/71.1 |
| 2004/0226116 | A1 * | 11/2004 | O'Donnell | B60P 1/431 14/69.5 |
| 2005/0215371 | A1 | 9/2005 | Navarro | |
| 2006/0288501 | A1 | 12/2006 | Thygesen | |
| 2007/0261181 | A1 | 11/2007 | Willard | |
| 2008/0042464 | A1 | 2/2008 | Hutchins, Jr. | |
| 2008/0106058 | A1 * | 5/2008 | Demick | B60R 3/002 14/71.1 |
| 2008/0184500 | A1 | 8/2008 | Bettcher | |
| 2009/0108614 | A1 | 4/2009 | Washington | |
| 2009/0274542 | A1 | 11/2009 | Pocobello | |
| 2010/0332085 | A1 | 12/2010 | Song | |
| 2011/0027054 | A1 | 2/2011 | Hansen | |
| 2011/0135432 | A1 * | 6/2011 | Budd | A61G 3/061 14/71.1 |
| 2012/0233787 | A1 | 9/2012 | Couto | |
| 2014/0044512 | A1 | 2/2014 | Couto | |
| 2015/0052693 | A1 | 2/2015 | Allen | |
| 2018/0105091 | A1 | 4/2018 | Stevens | |
| 2019/0106042 | A1 | 4/2019 | Hill | |
| 2021/0000666 | A1 | 1/2021 | Smith | |
| 2021/0361499 | A1 | 11/2021 | Pujol Oller et al. | |
| 2023/0257032 | A1 | 8/2023 | Harmon | |
| 2024/0075864 | A1 | 3/2024 | Van Wiemeersch | |
| 2024/0116424 | A1 | 4/2024 | Smith | |

FOREIGN PATENT DOCUMENTS

| | | | | |
|---|---|---|---|---|
| CN | 219192055 | U | 6/2023 | |
| EP | 3156026 | A2 | 4/2017 | |
| GB | 2415179 | A | 12/2005 | |
| GB | 2415680 | A | 1/2006 | |
| KR | 101157563 | B1 | 6/2012 | |
| KR | 102422681 | B1 | 7/2022 | |
| WO | WO-9626848 | A1 * | 9/1996 | A61G 3/061 |
| WO | WO-0020252 | A1 * | 4/2000 | A61G 3/067 |
| WO | 02079018 | A1 | 10/2002 | |
| WO | WO-03064208 | A1 * | 8/2003 | B60P 1/431 |

* cited by examiner

RAMP APPARATUS FOR VEHICLE

CROSS-REFERENCE TO RELATED APPLICATIONS

This application is based on and claims the benefit of priority to Korean Patent Application No. 10-2022-0105098, filed on Aug. 22, 2022, in the Korean Intellectual Property Office, which application is incorporated herein in its entirety by reference.

TECHNICAL FIELD

The present disclosure relates to a ramp apparatus for a vehicle.

BACKGROUND

Vehicles such as buses or wheelchair accessible vehicles or mobility vans for handicapped people may include a ramp apparatus that assists in boarding or unboarding of people in wheelchairs. The ramp apparatus may have a ramp platform stowed on a floor of a vehicle body, and the ramp platform may be manually or automatically deployed by a user from the vehicle body to the ground. The deployed ramp platform may be inclined at a predetermined angle with respect to the ground.

Due to the slope (inclination) of the ramp platform, it may be difficult to apply the ramp apparatus to general passenger vehicles with a high step-in height, except for low floor buses/non-step buses.

Meanwhile, wheelchair accessible vehicles or mobility vans for handicapped people may be designed as follows: remove a portion of a rear chassis from a vehicle body; lower a rear floor; cut off a portion of a rear bumper to modify a rear portion of the vehicle body; and mount a ramp apparatus on the modified rear portion.

However, the existing ramp apparatus may not increase a deployment length of the ramp platform due to a lack of storage space (stowage) on the rear floor, which makes it difficult to reduce the slope of the ramp platform. In particular, the deployment length of the ramp platform may be relatively short, which makes it difficult to meet a legal standard for slope (for example, 14°).

Some ramp apparatuses may be designed to allow the plurality of ramp platforms to be extended from the vehicle body to the ground so that the ramp platforms may meet the legal standard for slope. However, an operation system of the plurality of ramp platforms may be very complex, so a deployment speed thereof may be excessively slow. It may be difficult to use them for various purposes, causing an inconvenience in use.

The above information described in this background section is provided to assist in understanding the background of the inventive concept, and may include any technical concept which is not considered as the prior art that is already known to those skilled in the art.

SUMMARY

The present disclosure relates to a ramp apparatus for a vehicle, and more particularly, to a ramp apparatus for a vehicle designed to be telescopically deployed/extended and retracted.

The present disclosure has been made to solve the above-mentioned problems occurring in the prior art while advantages achieved by the prior art are maintained intact.

An aspect of the present disclosure provides a ramp apparatus for a vehicle allowing a ramp assembly to be telescopically deployed/extended from a vehicle body to the ground or be retracted, thereby effectively increasing a deployment length of the ramp assembly, minimizing a storage space (stowage) of the ramp assembly, increasing a deployment speed of the ramp assembly, and being usable for various purposes.

According to an aspect of the present disclosure, a ramp apparatus for a vehicle may include: a housing mounted on a vehicle body; and a ramp assembly moving between a stowed position in which the ramp assembly is stowed in the housing and a deployed or extended position in which the ramp assembly is deployed or extended out from the housing. The ramp assembly may move telescopically to be deployed/extended and retracted.

The ramp apparatus may further include a hinge mechanism allowing the ramp assembly to pivot when the ramp assembly is deployed from the housing. The hinge mechanism may include a moving body connected to the ramp assembly through a hinge shaft, and a hinge drive unit mounted on the moving body.

The moving body may be movable in the housing, the hinge shaft may be fixedly connected to the ramp assembly, and the hinge drive unit may rotate the hinge shaft.

The ramp apparatus may further include a moving mechanism allowing the moving body to move. The moving mechanism may include a drive sprocket, a driven sprocket spaced apart from the drive sprocket, a chain connecting the drive sprocket and the driven sprocket, and a motor driving the drive sprocket. The chain may be connected to the moving body through a chain attachment.

The hinge drive unit may include a motor, and a mounting bracket by which the motor is mounted on the moving body. The motor of the hinge drive unit may have an output shaft fitted into the hinge shaft.

The ramp assembly may include a first ramp platform connected to the moving body through the hinge shaft, a second ramp platform telescopically connected to the first ramp platform, and a third ramp platform telescopically connected to the second ramp platform.

The hinge mechanism may further include a hinge lug fixed to the first ramp platform, and the hinge shaft may be fitted into the hinge lug.

The ramp apparatus may further include a hinge stopper fixed to the hinge lug, and the hinge stopper may come into contact with or be spaced apart from the moving body according to a rotation direction of the hinge shaft.

The ramp apparatus may further include a drive mechanism configured to allow the ramp platforms of the ramp assembly to be extended and retracted. The drive mechanism may be mounted on the second ramp platform, and the first ramp platform and the third ramp platform may be operatively connected to the drive mechanism.

The drive mechanism may include a drive sprocket, a driven sprocket spaced apart from the drive sprocket, a chain connecting the drive sprocket and the driven sprocket, and a motor driving the drive sprocket.

The chain may include a first chain attachment, and a second chain attachment spaced apart from the first chain attachment. The first chain attachment may be fixed to the first ramp platform, and the second chain attachment may be fixed to the third ramp platform.

The first chain attachment may have a projection fixed to the first ramp platform.

The second ramp platform may have a slot provided in at least one sidewall thereof, and the projection of the first chain attachment may be guided along the slot.

The second chain attachment may have a projection fixed to the third ramp platform.

The first ramp platform may have a first recess at least partially receiving the moving mechanism, and the first recess may extend along the length of the first ramp platform.

The second ramp platform may have a second recess which is complementary to the first recess of the first ramp platform, and the second recess may extend along the length of the second ramp platform.

The third ramp platform may have a third recess which is complementary to the second recess of the second ramp platform, and the third recess may extend along the length of the third ramp platform.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
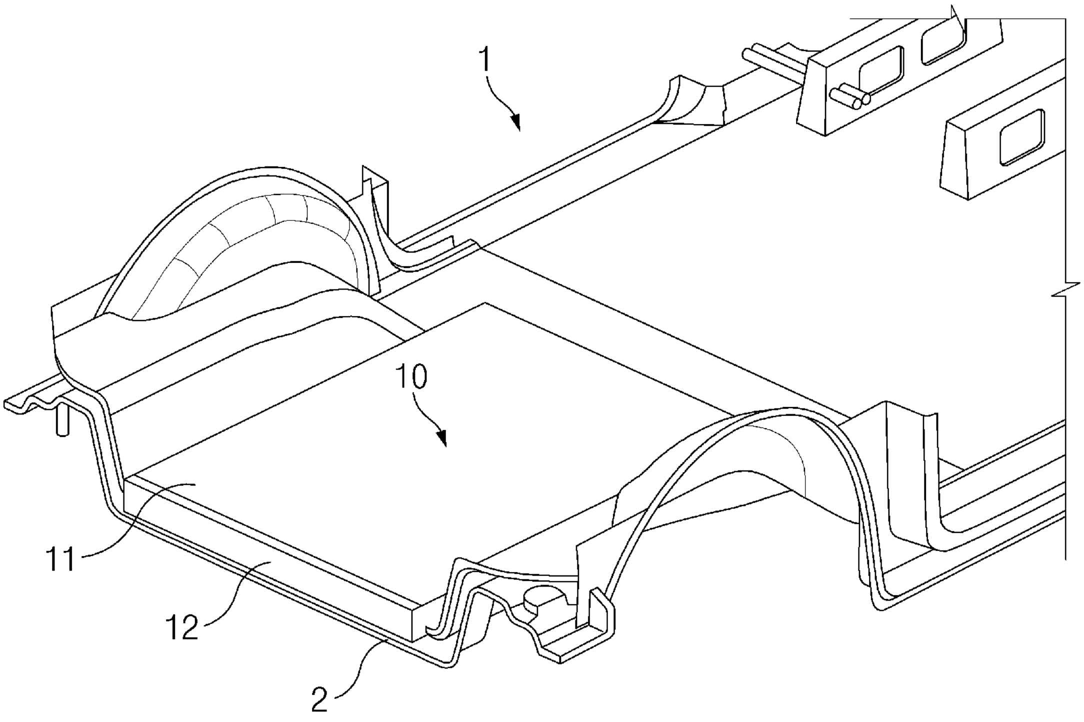
FIG. 1 illustrates a perspective view of a ramp apparatus for a vehicle according to an exemplary embodiment of the present disclosure, which is disposed on a floor of a vehicle body.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of aft, and are not to be interpreted as having ideal or excessively formal meanings unless clearly defined as having such in the present application.

A ramp apparatus 10 for a vehicle according to an exemplary embodiment of the present disclosure may be applied to various vehicles, and be disposed on a floor of a vehicle body. The ramp apparatus 10 may be designed to be deployed (extended out) from the floor of the vehicle body to the ground.

Referring to FIG. 1, the ramp apparatus 10 for a vehicle according to an exemplary embodiment of the present disclosure may be disposed on a rear floor 2 of a vehicle body 1. The ramp apparatus 10 for a vehicle may include a housing 11 fixedly mounted on the rear floor 2 of the vehicle body 1.

Figure 2:
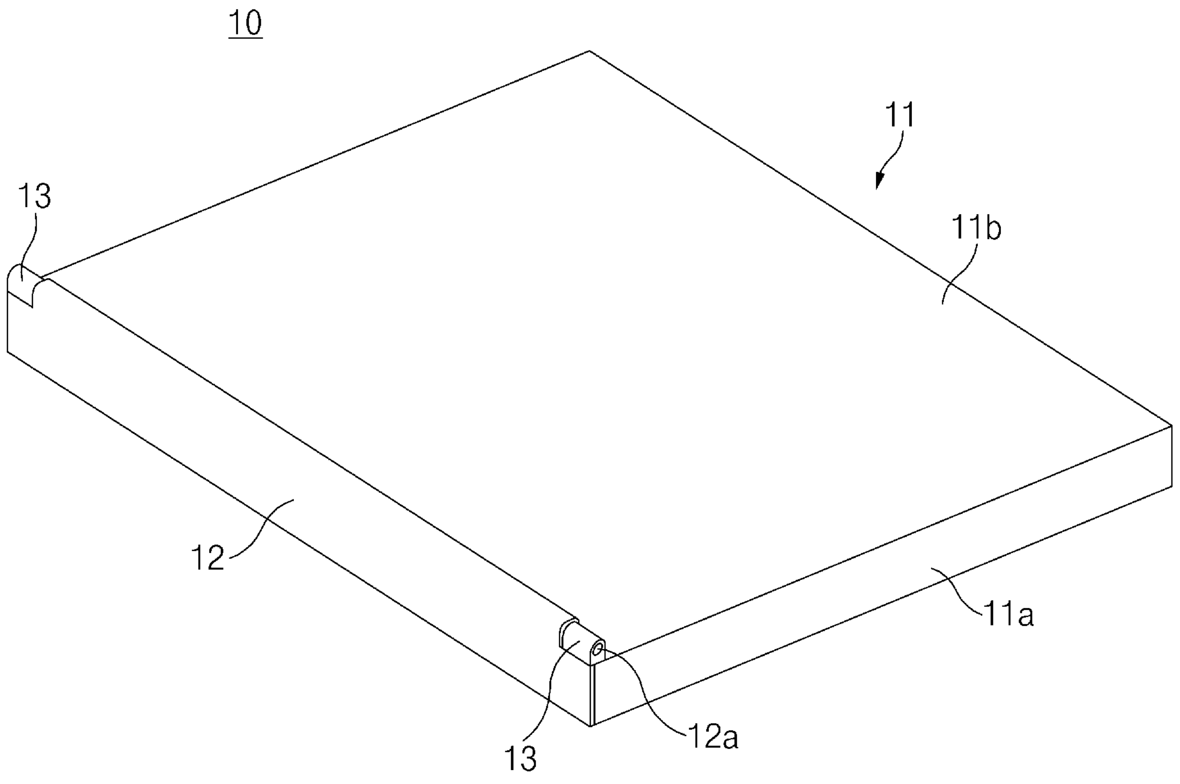
FIG. 2 illustrates a perspective view of a state in which a ramp assembly is stowed in an internal space of a housing in a ramp apparatus for a vehicle according to an exemplary embodiment of the present disclosure.
Figure 3:
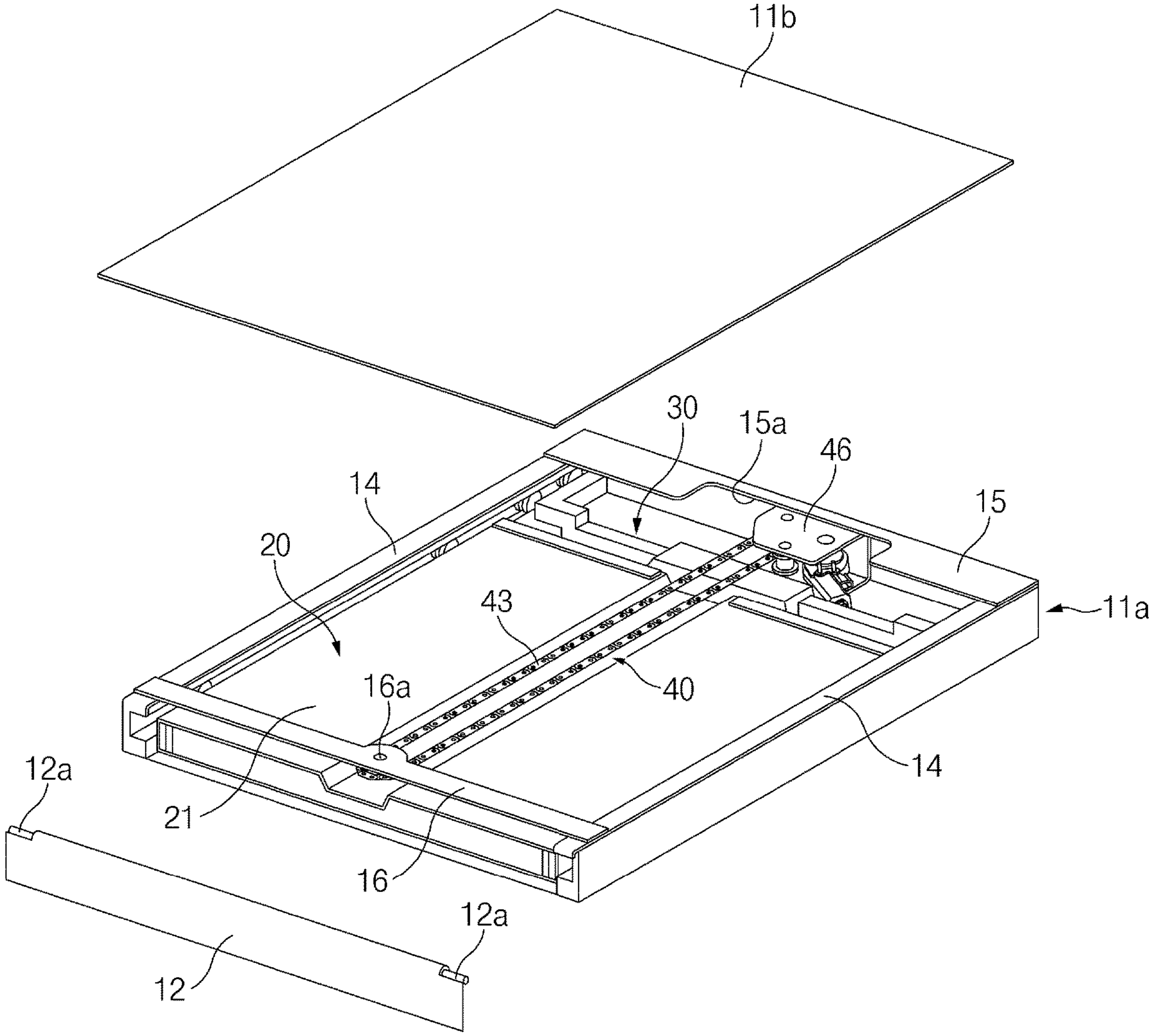
FIG. 3 illustrates an exploded perspective view of an upper cover and a gate which are separated from a lower case of the housing in the ramp apparatus illustrated in FIG. 2.

The housing 11 may have a trailing end portion facing the interior of the vehicle and a leading end portion facing the exterior of the vehicle, and the trailing end portion and the leading end portion may oppose each other. Referring to FIGS. 2 and 3, the housing 11 may include a lower case 11*a* and an upper panel 11*b*. The lower case 11*a* may include a bottom wall and a plurality of sidewalls connected to the bottom wall. The upper panel 11*b* may cover the lower case 11*a*. The housing 11 may have an internal space defined by the lower case 11*a* and the upper panel 11*b*. The housing 11 may have a leading opening provided in the leading end portion, and the housing 11 may be open to the exterior of the vehicle through the leading opening. The housing 11 may have a pair of pivot lugs 13 provided on the leading end portion, and a gate 12 may be mounted to open and close on the leading end portion of the housing 11. A pair of pivot pins 12*a* may be provided on both sides of the gate 12. The pivot pins 12*a* may be fitted into the corresponding pivot lugs 13, respectively, so that the gate 12 may be pivotally connected to the leading end portion of the housing 11 through the pivot pins 12*a*. Accordingly, the gate 12 may cover or uncover the leading opening of the housing 11.

Referring to FIG. 3, the housing 11 may include a first support bracket 15 and a second support bracket 16 mounted on the lower case 11*a*. The first support bracket 15 may be adjacent to the trailing end portion of the housing 11, and the first support bracket 15 may extend along the width of the housing 11. The first support bracket 15 may be mounted across both sidewalls of the lower case 11*a*, and the first support bracket 15 may support the trailing end portion of the upper panel 11*b*. The second support bracket 16 may be adjacent to the leading end portion of the housing 11, and the second support bracket 16 may extend along the width of the housing 11. The second support bracket 16 may be mounted across both sidewalls of the lower case 11*a*, and the second support bracket 16 may support the leading end portion of the upper panel 11*b*.

Referring to FIG. 3, the housing 11 may include a pair of guide rails 14 mounted on the opposing sidewalls of the lower case 11*a*, respectively. The pair of guide rails 14 may guide the movements of a ramp assembly 20 and a hinge mechanism 30 to be described below.

Figure 5:
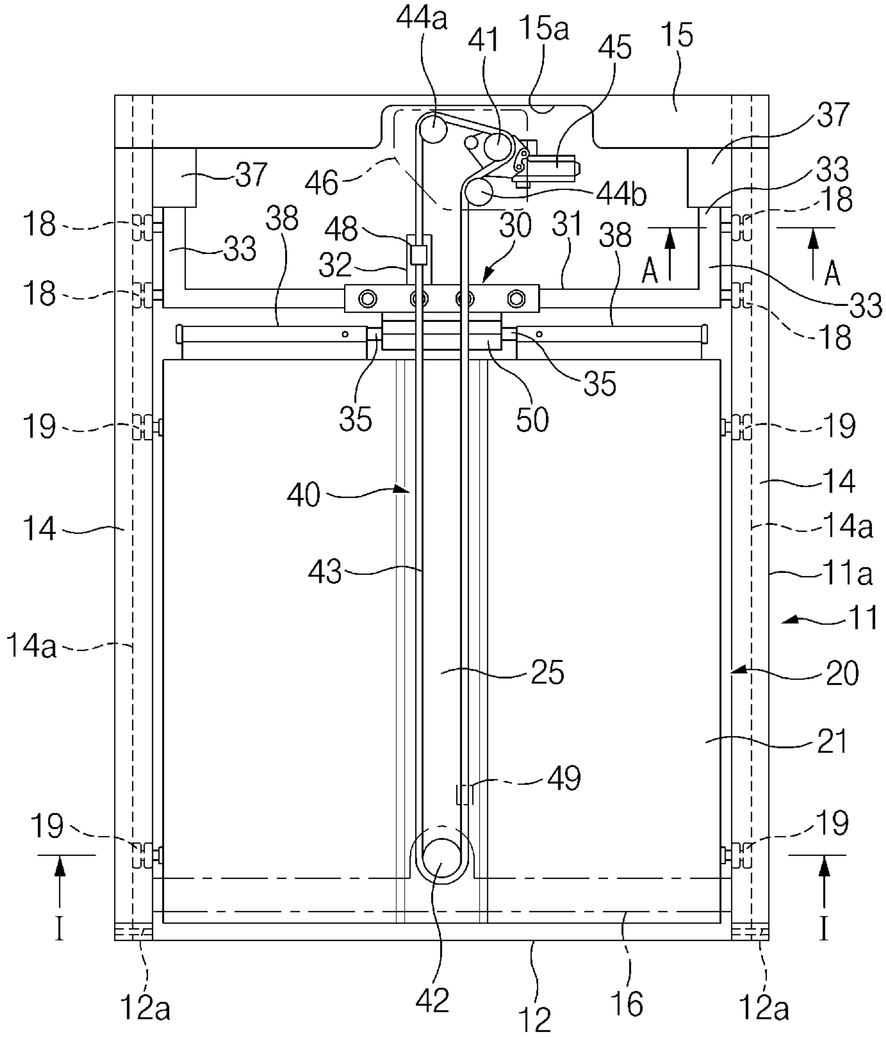
FIG. 5 illustrates a plan view of a state in which a ramp assembly is stowed in an internal space of a housing in a ramp apparatus for a vehicle according to an exemplary embodiment of the present disclosure, from which an upper cover of the housing is removed.
Figure 6:
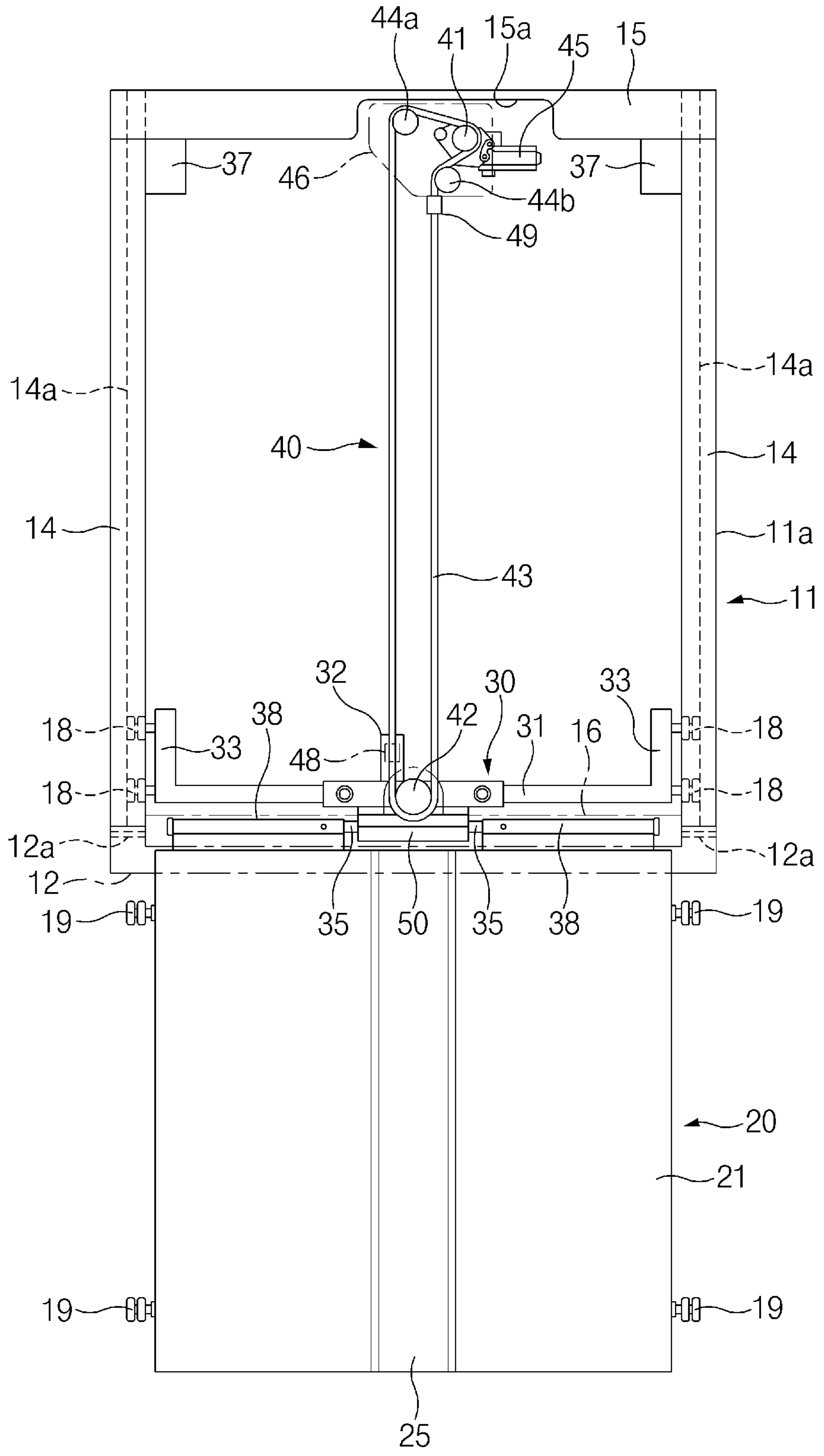
FIG. 6 illustrates a plan view of a state in which a ramp assembly is deployed from an internal space of a housing in a ramp apparatus for a vehicle according to an exemplary embodiment of the present disclosure, from which an upper cover of the housing is removed.

The ramp apparatus 10 for a vehicle according to an exemplary embodiment of the present disclosure may include the ramp assembly 20 which is movable with respect to the housing 11. The ramp assembly 20 may move between a stowed position (see FIG. 5) and a deployed position (see FIG. 6). Referring to FIG. 5, the stowed position refers to a position in which the ramp assembly 20 is stowed in the internal space of the housing 11. Referring to FIG. 6, the deployed position refers to a position in which the ramp assembly 20 is deployed from the housing 11.

Figure 4:
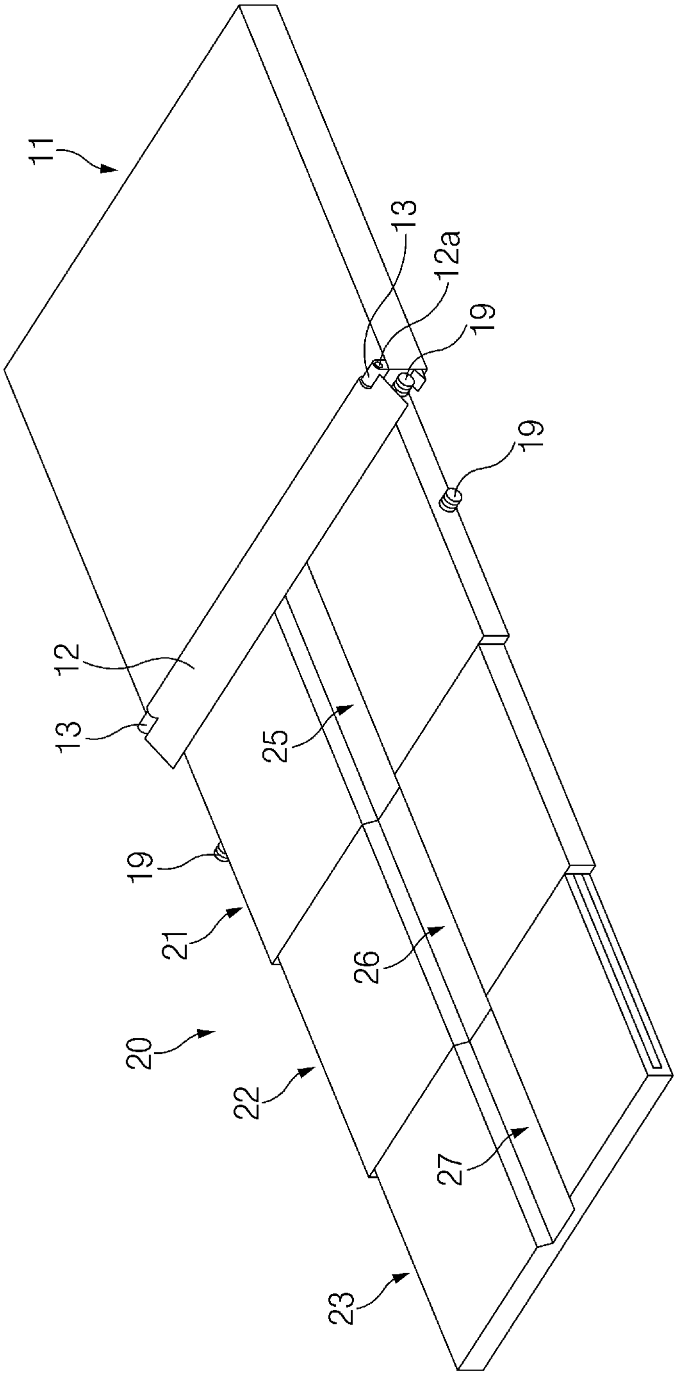
FIG. 4 illustrates a perspective view of a state in which a ramp assembly is deployed from a housing and ramp platforms of the ramp assembly are fully extended in a ramp apparatus for a vehicle according to an exemplary embodiment of the present disclosure.

Referring to FIG. 4, the ramp assembly 20 may include a plurality of ramp platforms 21, 22, and 23 telescopically connected to each other. Specifically, the plurality of ramp platforms 21, 22, and 23 may include a first ramp platform 21, a second ramp platform 22 telescopically connected to the first ramp platform 21, and a third ramp platform 23 telescopically connected to the second ramp platform 22.

The first ramp platform 21 may include a trailing end portion facing the interior of the vehicle and a leading end portion facing the exterior of the vehicle. The first ramp platform 21 may have a leading opening provided in the leading end portion thereof, and the first ramp platform 21 may have a cavity defined therein. The second ramp platform 22 may be stowed in the cavity of the first ramp platform 21.

Specifically, the first ramp platform 21 may be movable between a stowed position in which the first ramp platform 21 is stowed in the internal space of the housing 11 and a deployed position in which the first ramp platform 21 is deployed from the housing 11.

Figure 21:
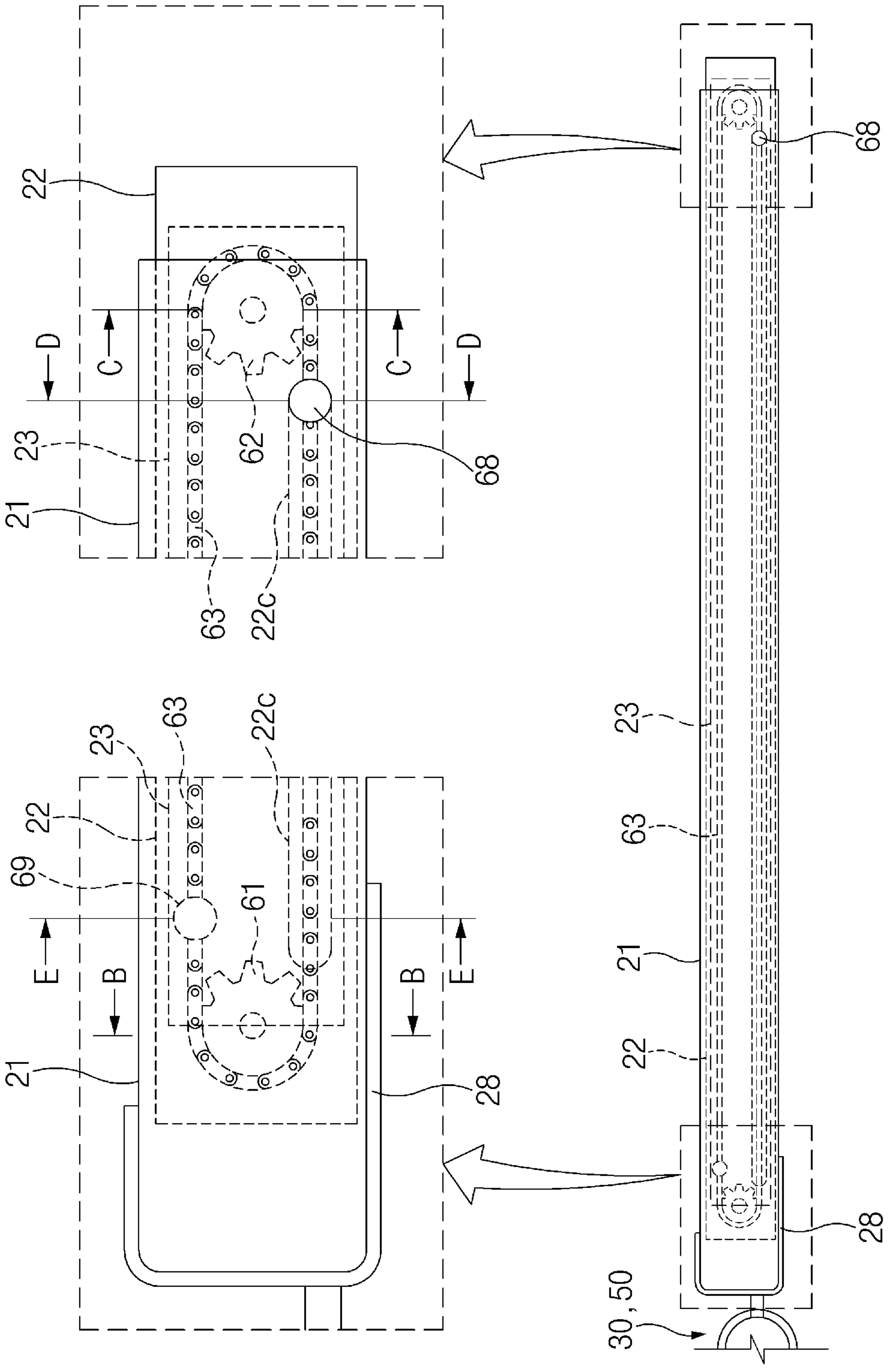
FIG. 21 illustrates a side view of a state in which ramp platforms of a ramp assembly are fully retracted in a ramp apparatus for a vehicle according to an exemplary embodiment of the present disclosure.
Figure 27:
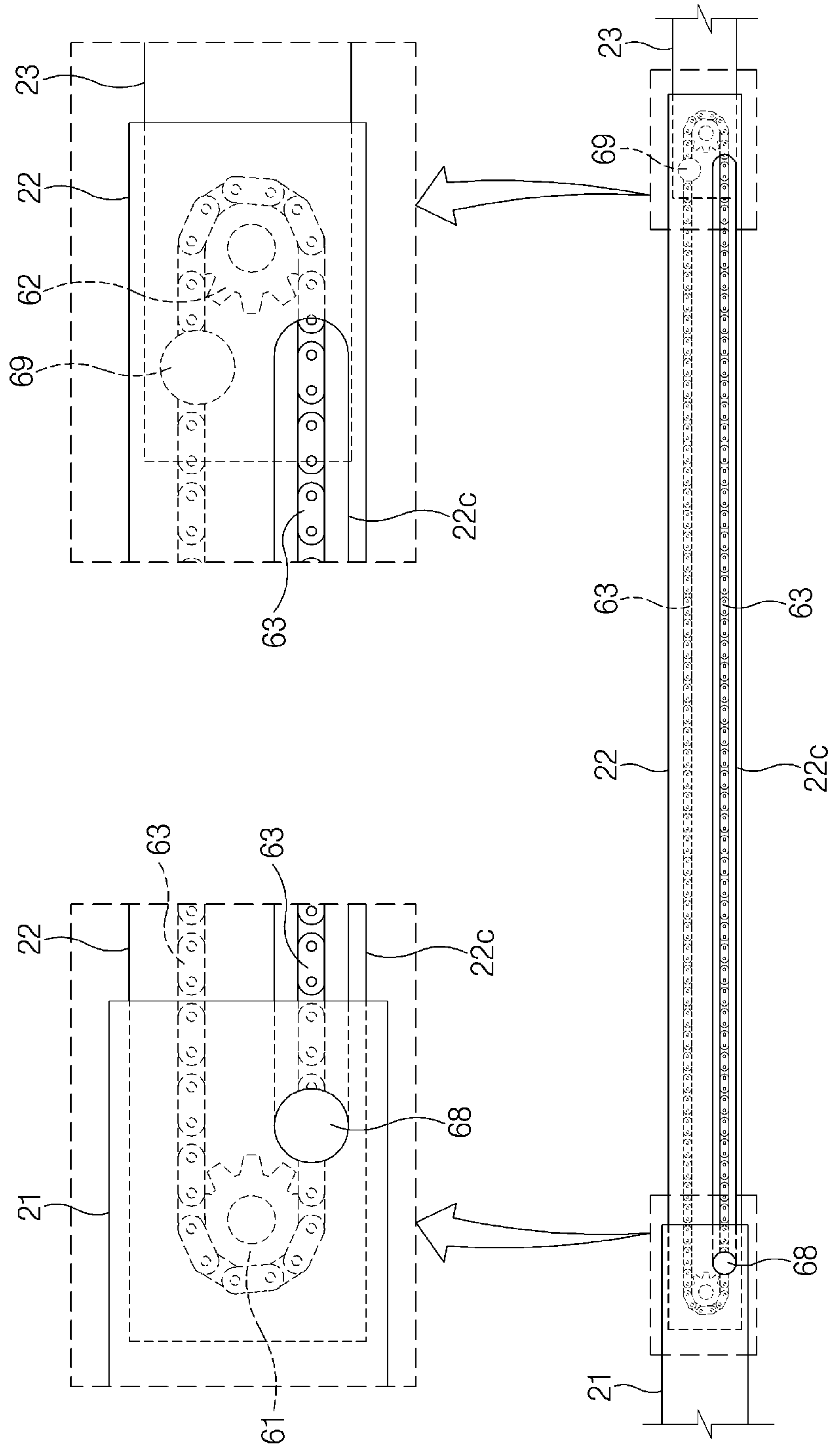
FIG. 27 illustrates a side view of a state in which ramp platforms of a ramp assembly are fully extended in a ramp apparatus for a vehicle according to an exemplary embodiment of the present disclosure.
Figure 28:
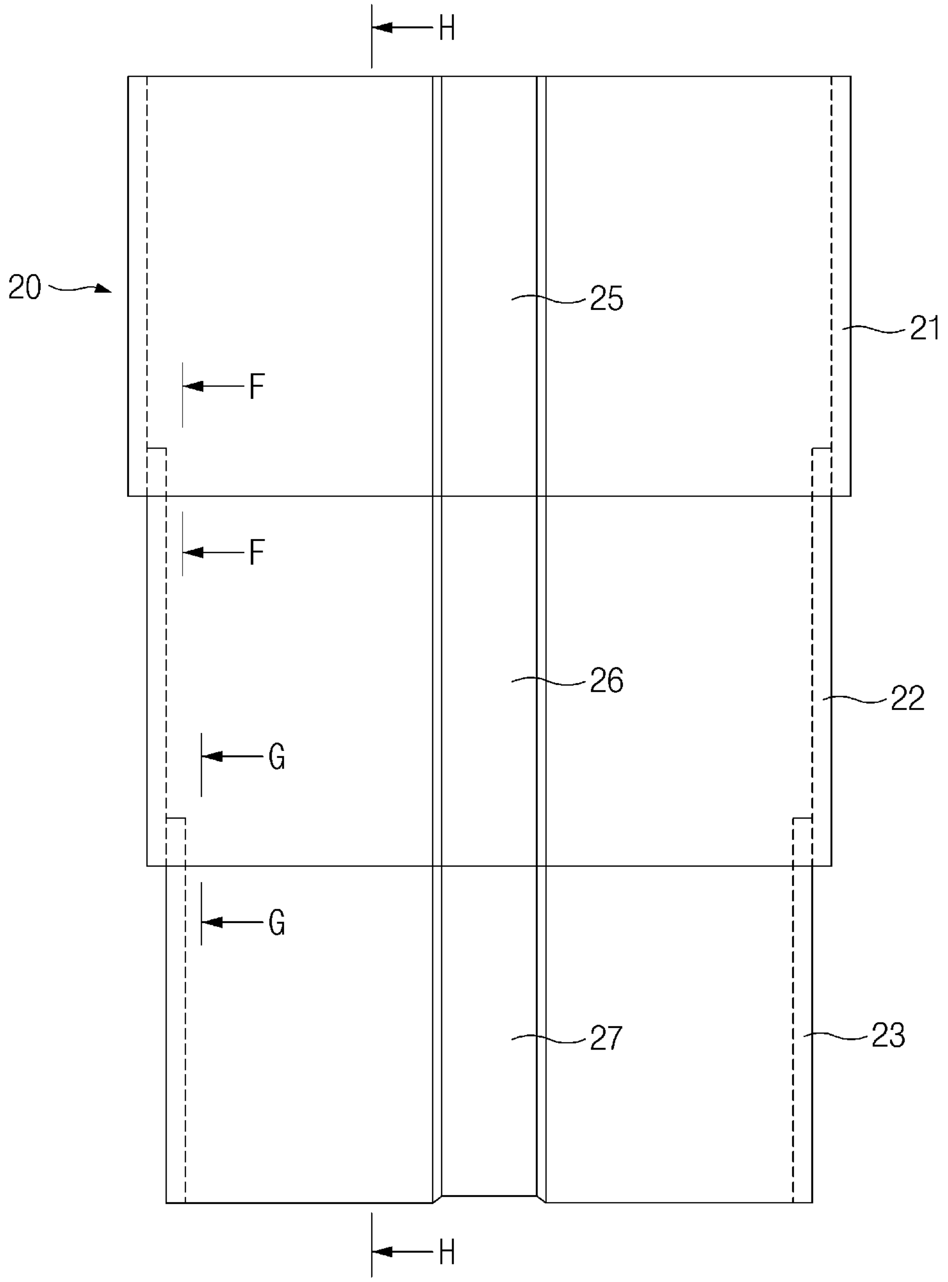
FIG. 28 illustrates a plan view of a state in which ramp platforms of a ramp assembly are fully extended in a ramp apparatus for a vehicle according to an exemplary embodiment of the present disclosure.

The second ramp platform 22 may include a trailing end portion facing the interior of the vehicle and a leading end portion facing the exterior of the vehicle. The second ramp platform 22 may have a leading opening provided in the leading end portion thereof, and a trailing opening provided in the trailing end portion thereof. The second ramp platform 22 may have a cavity defined therein, and the third ramp platform 23 may be stowed in the cavity of the second ramp platform 22. The second ramp platform 22 may be movable between a stowed position (see FIG. 21) and an extended position (see FIGS. 27 and 28). Referring to FIG. 21, the stowed position refers to a position in which the second ramp platform 22 is stowed in the cavity of the first ramp platform 21. Referring to FIGS. 27 and 28, the extended position refers to a position in which the second ramp platform 22 is extended out from the first ramp platform 21.

The third ramp platform 23 may include a trailing end portion facing the interior of the vehicle and a leading end portion facing the exterior of the vehicle. The third ramp platform 23 may have a leading opening provided in the leading end portion thereof, and a trailing opening provided in the trailing end portion thereof. The third ramp platform 23 may have a cavity defined therein. The third ramp platform 23 may be movable between a stowed position (see FIG. 21) and an extended position (see FIGS. 27 and 28). Referring to FIG. 21, the stowed position refers to a position in which the third ramp platform 23 is stowed in the cavity of the second ramp platform 22. Referring to FIGS. 27 and 28, the extended position refers to a position in which the third ramp platform 23 is extended out from the second ramp platform 22.

The ramp apparatus 10 for a vehicle according to an exemplary embodiment of the present disclosure may include the hinge mechanism 30 allowing the ramp assembly 20 to pivot with respect to the housing 11 when the ramp assembly 20 is deployed from the housing 11.

Referring to FIGS. 5 and 6, the hinge mechanism 30 may include a moving body 31 connected to the ramp assembly 20 through a hinge shaft 35, and a hinge drive unit 50 mounted on a central portion of the moving body 31. The moving body 31 may have holes 31*a* provided at the central portion of the moving body 31.

Referring to FIGS. 5 and 6, the moving body 31 may extend along the width of the housing 11. The moving body 31 may include a central extension portion 32 extending from the central portion of the moving body 31 toward the trailing end portion of the housing 11, and a pair of side extension portions 33 extending from both ends of the moving body 31 toward the trailing end portion of the housing 11. The central extension portion 32 and each side extension portion 33 may extend along the length of the housing 11.

The moving body 31 may move along a longitudinal direction of the housing 11 in the internal space of the housing 11 by a moving mechanism 40 to be described below. Referring to FIGS. 5 and 6, the moving body 31 may include a plurality of guide rollers 18 rolling along the pair of guide rails 14. The plurality of guide rollers 18 may be rotatably mounted on the pair of side extension portions 33, and each guide roller 18 may roll along a guide passage 14*a* of the corresponding guide rail 14. As the plurality of guide rollers 18 roll along the pair of guide rails 14, the moving body 31 may move in the internal space of the housing 11.

Figure 7:
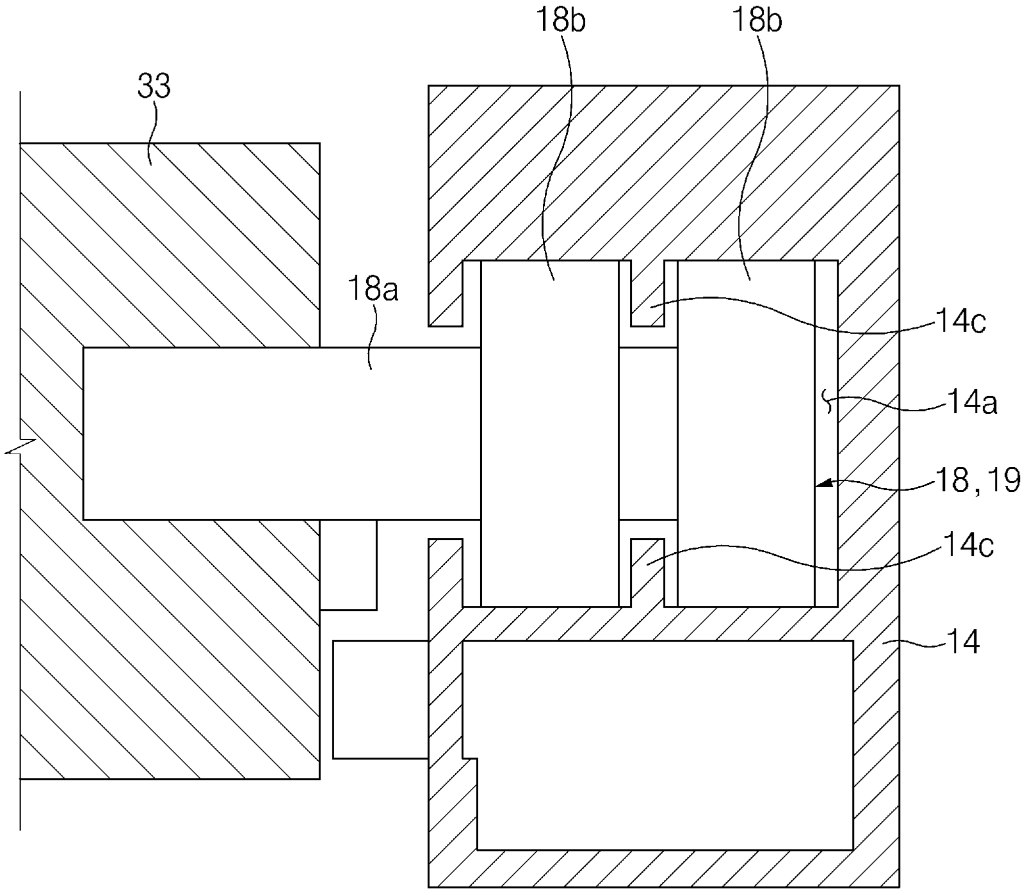
FIG. 7 illustrates a cross-sectional view, taken along line A-A of FIG. 5.

Referring to FIG. 7, each guide roller 18 may include a roller shaft 18*a*, and two roller members 18*b* rotatably mounted on the roller shaft 18*a*. The two roller members 18*b* may be spaced apart from each other in a longitudinal direction of the roller shaft 18*a*. The guide rail 14 may have the guide passage 14*a* guiding the movements of the roller members 18*b*, and a splitting projection 14*c* may divide the guide passage 14*a* into two passages.

Referring to FIG. 5, when the moving body 31 moves close to the trailing end portion of the housing 11, the ramp assembly 20 may be fully stowed in the internal space of the housing 11. Referring to FIG. 6, when the moving body 31 moves close to the leading end portion of the housing 11, the ramp assembly 20 may be fully deployed from the internal space of the housing 11.

Referring to FIGS. 5 and 6, the housing 11 may further include a pair of stoppers 37 provided therein, and the pair of stoppers 37 may be configured to restrict a stowed position of the moving body 31. The pair of stoppers 37 may be aligned with the pair of side extension portions 33. When the moving body 31 moves toward the trailing end portion of the housing 11, the side extension portions 33 may come into contact with the corresponding stoppers 37, respectively, so that the movement of the moving body 31 may be stopped. When each side extension portion 33 of the moving body 31 comes into contact with the corresponding stopper 37, a current applied to a motor 45 of the moving mechanism 40 may be higher than a threshold. Specifically, when each side extension portion 33 of the moving body 31 comes into contact with the corresponding stopper 37, a controller (not shown) may determine that the current applied to the motor 45 is higher than the threshold. When the current applied to the motor 45 is higher than the threshold, the controller may block the current applied to the motor 45 to thereby stop the motor 45.

Figure 15:
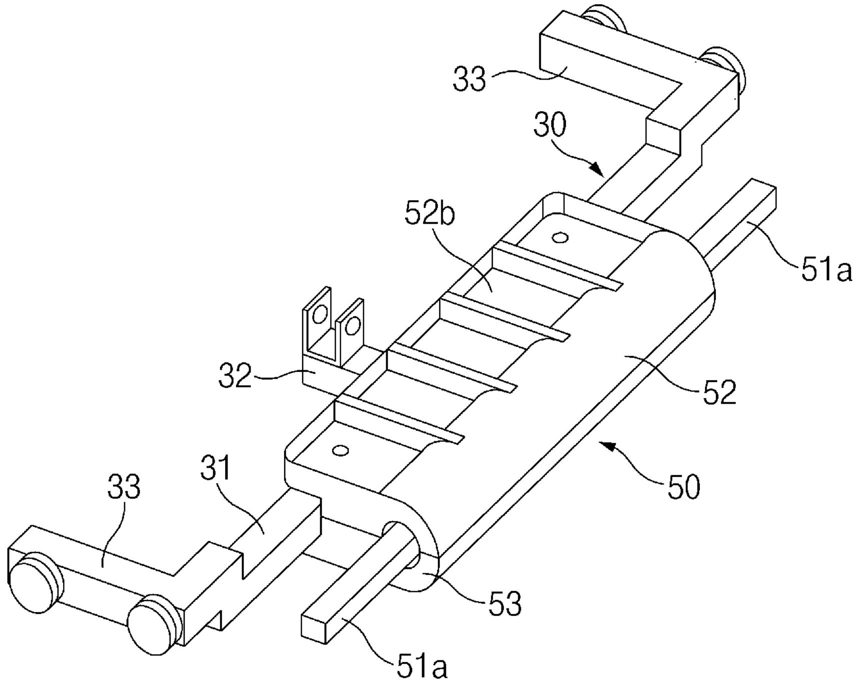
FIG. 15 illustrates a perspective view of a hinge mechanism in a ramp apparatus for a vehicle according to an exemplary embodiment of the present disclosure.
Figure 16:
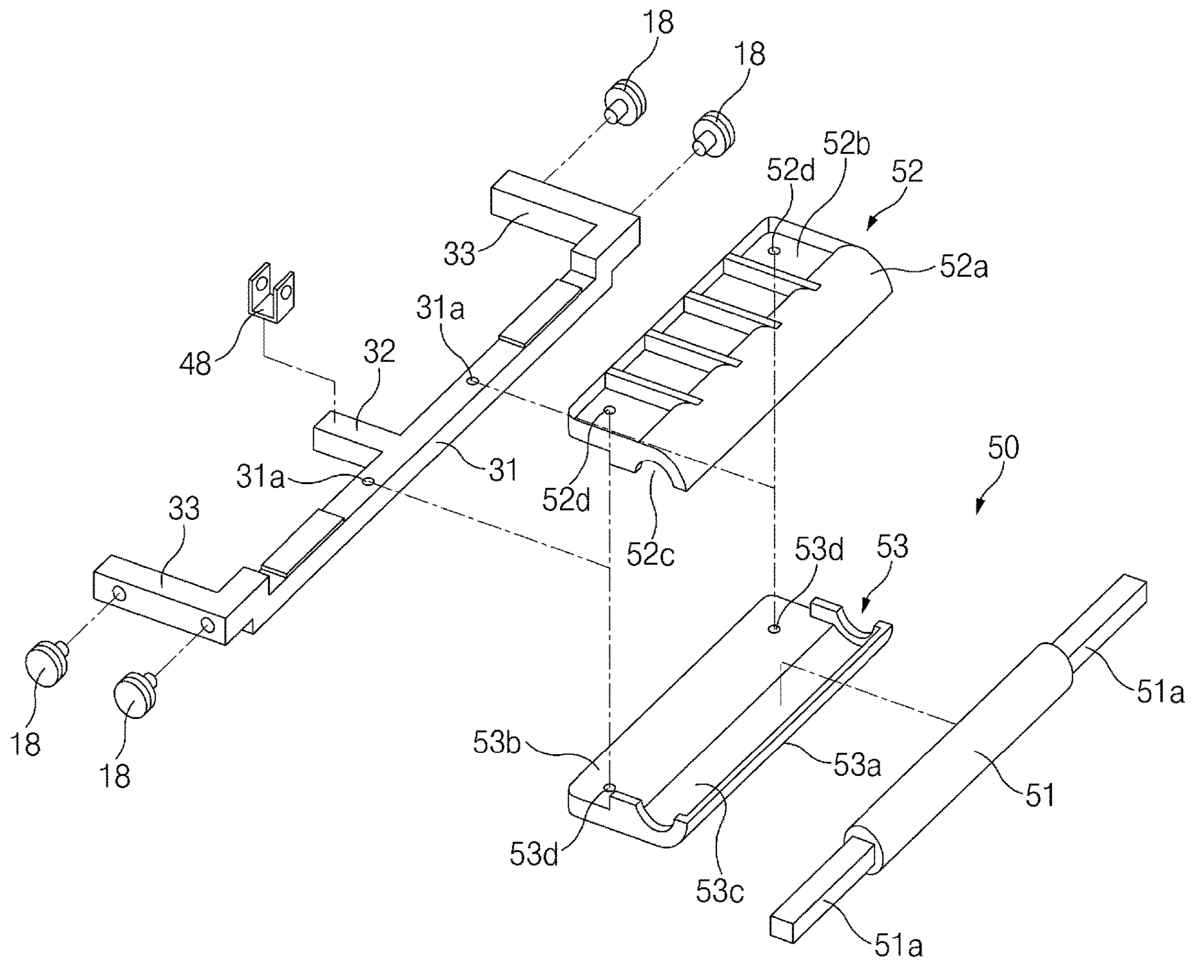
FIG. 16 illustrates an exploded perspective view of a hinge mechanism in a ramp apparatus for a vehicle according to an exemplary embodiment of the present disclosure.

Referring to FIGS. 15 and 16, the hinge drive unit 50 may include a motor 51, and an upper mounting bracket 52 and a lower mounting bracket 53 by which the motor 51 is mounted on the central portion of the moving body 31.

The motor 51 may be a bidirectional motor operating clockwise and counterclockwise. The motor 51 may be a dual shaft motor having a pair of output shafts 51*a* opposite to each other, and the pair of output shafts 51*a* may extend from the motor 51 symmetrically. An axis of each output shaft 51*a* may be aligned with an axis of a motor housing of the motor 51. Each output shaft 51*a* may be a rectangular bar, and the motor 51 may have a cylindrical shape.

The upper mounting bracket 52 may include an upper cover 52*a* covering an upper portion of the motor 51, and an upper fixed portion 52*b* fixed to a hole 31*a* of the central portion of the moving body 31. The upper cover 52*a* may have a semicircular cavity 52*c* matching the upper portion of the motor 51, and the upper portion of the motor 51 may be received in the cavity 52*c* of the upper cover sea. The upper fixed portion 52*b* may have holes 52*d* aligned with the holes 31*a* of the moving body 31, respectively. The upper fixed portion 52*b* may be fixed to the central portion of the moving body 31 through a plurality of fasteners (screws, bolts, etc.).

The lower mounting bracket 53 may include a lower cover 53*a* covering a lower portion of the motor 51, and a lower fixed portion 53*b* fixed to the hole 31*a* of the central portion of the moving body 31. The lower cover 53*a* may have a semicircular cavity 53*c* matching the lower portion of the motor 51, and the lower portion of the motor 51 may be received in the cavity 53*c* of the lower cover 53*a*. The lower fixed portion 53*b* may be fixed to the central portion of the moving body 31 through a plurality of fasteners (screws, bolts, etc.).

Each hole 31*a* of the moving body 31 may be aligned with a corresponding hole 52*d* of the upper fixed portion 52*b* and a corresponding hole 53*d* of the lower fixed portion 53*b*. Each of the plurality of fasteners is received in the corresponding hole 31*a* of the moving body 31, the corresponding hole 52*d* of the upper fixed portion 52*b*, and the corresponding hole 53*d* of the lower fixed portion 53*b*.

Figure 13:
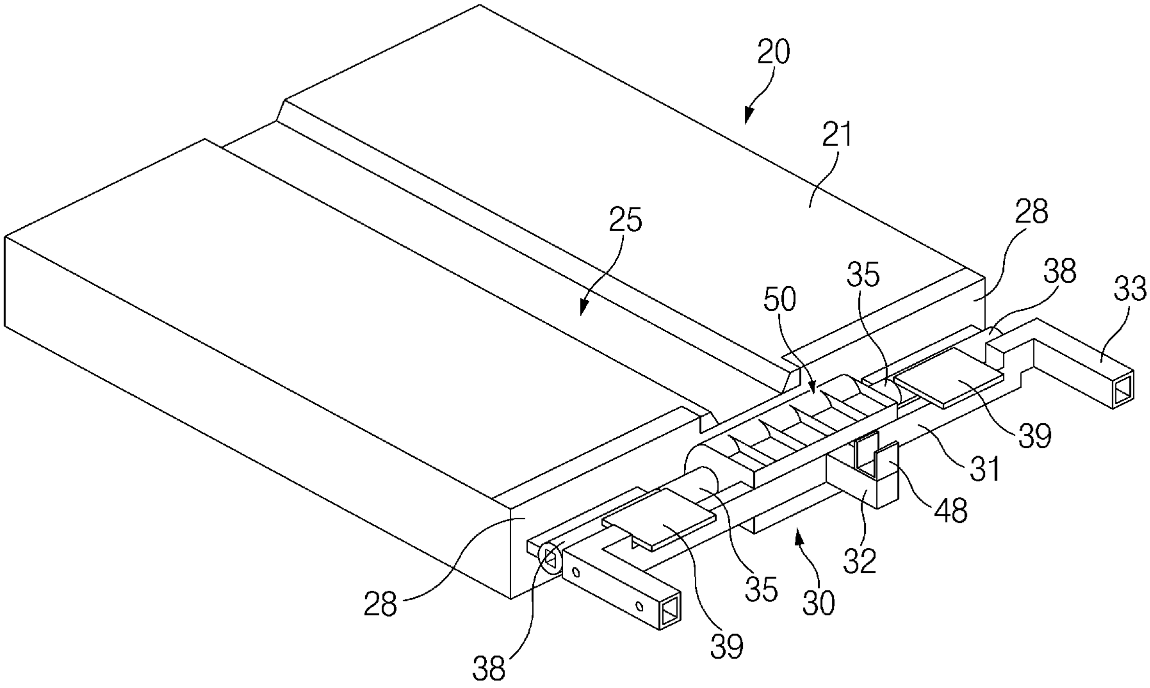
FIG. 13 illustrates a perspective view of a state in which a ramp assembly and a hinge mechanism are connected in a ramp apparatus for a vehicle according to an exemplary embodiment of the present disclosure.
Figure 14:
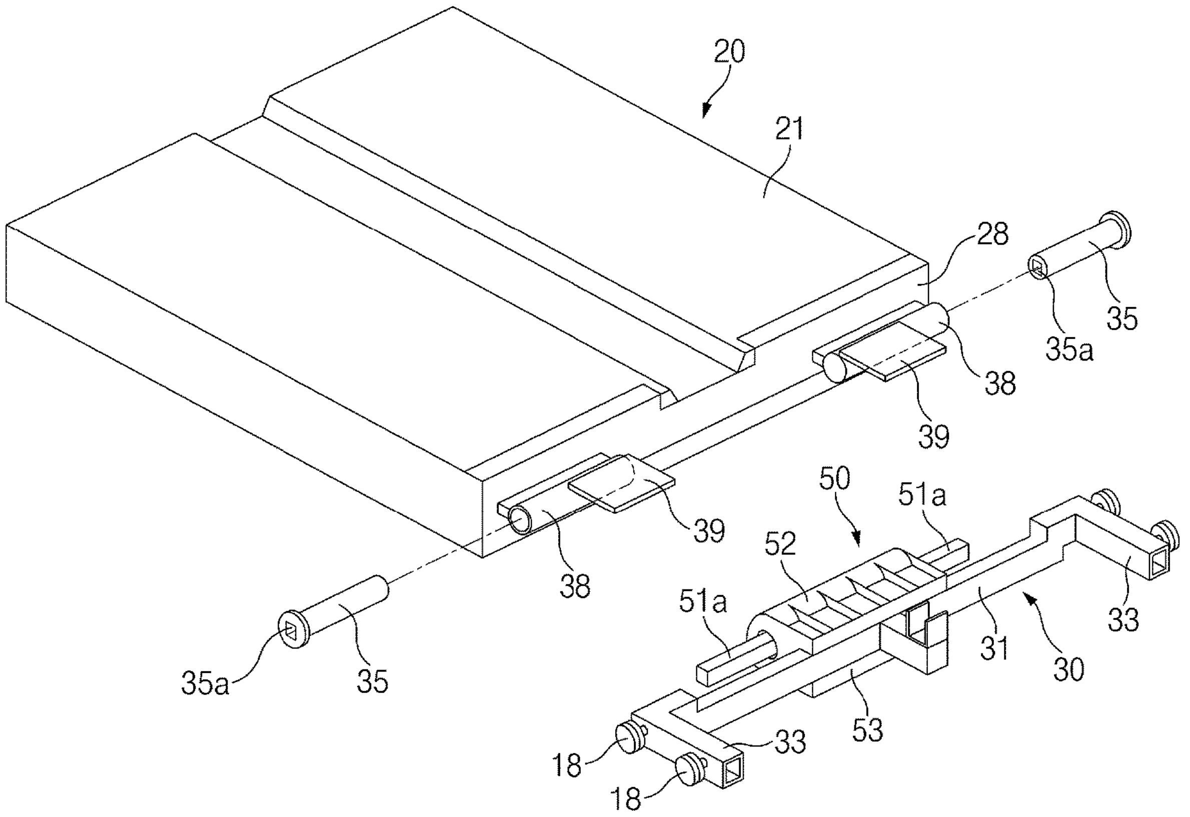
FIG. 14 illustrates an exploded perspective view of a state in which a ramp assembly and a hinge mechanism are separated in a ramp apparatus for a vehicle according to an exemplary embodiment of the present disclosure.

The hinge shaft 35 may be fixedly connected to the first ramp platform 21 of the ramp assembly 20, and the hinge shaft 35 may be rotated by the hinge drive unit 50. As the hinge drive unit 50 rotates the hinge shaft 35, the first ramp platform 21 of the ramp assembly 20 may pivot around the hinge shaft 35. Referring to FIGS. 13 and 14, the pair of hinge shafts 35 may be fixedly connected to the ramp assembly 20. A bracket 28 may be fixed to the trailing end portion of the first ramp platform 21 of the ramp assembly 20, and a pair of hinge lugs 38 may be integrally connected to the bracket 28 so that the pair of hinge lugs 38 may be fixed to the first ramp platform 21 of the ramp assembly 20. Each hinge lug 38 may have a hole, and the hole of the hinge lug 38 may have an inner diameter slightly less than an outer diameter of the hinge shaft 35. An axis of the hinge shaft 35 may be aligned with an axis of the hinge lug 38. Each hinge shaft 35 may be press-fit into the hole of the corresponding hinge lug 38 so that the hinge shaft 35 and the corresponding hinge lug 38 may be fixedly joined. Each hinge shaft 35 may have a rectangular hole 35*a* matching each output shaft 51*a* of the motor 51, and the axis of the output shaft 51*a* may be aligned with the axis of the hinge shaft 35. The output shaft 51*a* of the motor 51 may be fitted into the hole 35*a* of the corresponding hinge shaft 35 so that the output shaft 51*a* of the motor 51 and the corresponding hinge shaft 35 may be fixedly joined. That is, the pair of hinge shafts 35 may be directly rotated by the motor 51. Here, as the motor 51 operates, the hinge shafts 35 may rotate clockwise and counterclockwise, and the first ramp platform 21 of the ramp assembly 20 may pivot around the hinge shafts 35 clockwise and counterclockwise.

Referring to FIGS. 13 and 14, a hinge stopper 39 may be fixed to the hinge lug 38, and the hinge stopper 39 may extend from the hinge lug 38 toward the moving body 31. As the motor 51 of the hinge drive unit 50 rotates the hinge shaft 35 and the hinge lug 38 counterclockwise, the hinge stopper 39 may be spaced apart from the moving body 31 when the first ramp platform 21 of the ramp assembly 20 moves to an inclined position (see FIG. 17). As the motor 51 of the hinge drive unit 50 rotates the hinge shaft 35 and the hinge lug 38 clockwise, the hinge stopper 39 may come into contact with the moving body 31 when the first ramp platform 21 of the ramp assembly 20 moves to a horizontal position (see FIG. 18). Accordingly, a pivot angle of the hinge lug 38 and the ramp assembly 20 may be restricted.

Figure 17:
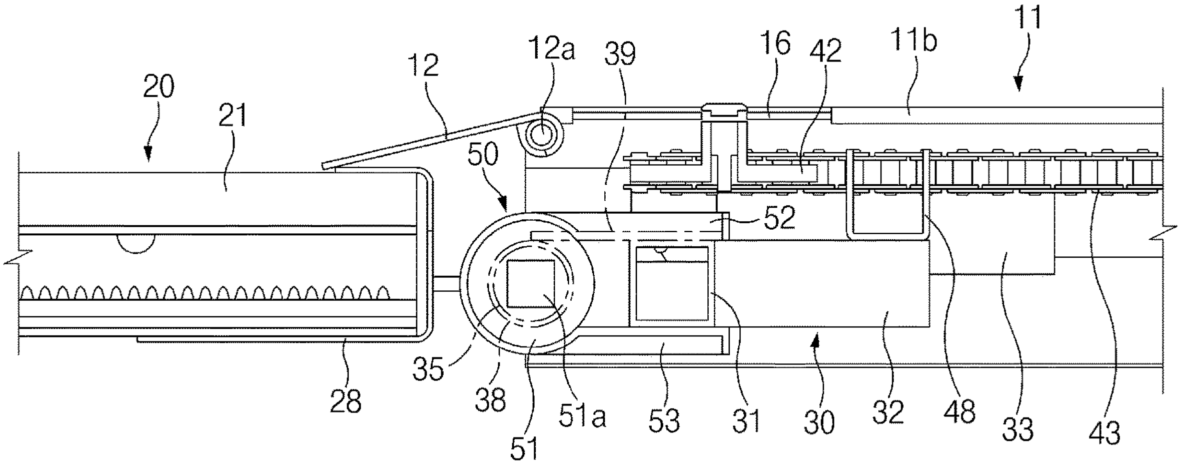
FIG. 17 illustrates a side sectional view of a state in which a ramp assembly is deployed from a housing in a ramp apparatus for a vehicle according to an exemplary embodiment of the present disclosure.
Figure 18:
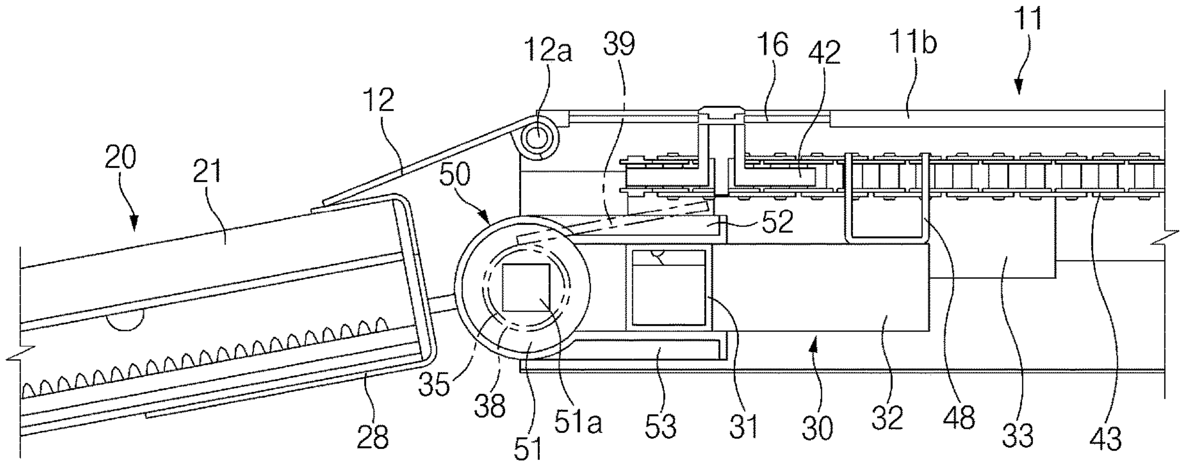
FIG. 18 illustrates a side sectional view of a state in which the ramp assembly pivots by a hinge mechanism in the ramp apparatus illustrated in FIG. 17.

Specifically, after the ramp assembly 20 is fully deployed from the housing 11 by the moving body 31 and the moving mechanism 40, the motor 51 of the hinge drive unit 50 may rotate the hinge shaft 35 and the hinge lug 38 clockwise and counterclockwise so that the ramp assembly 20 may move between a horizontal position (see FIG. 17) and an inclined position (see FIG. 18). Referring to FIG. 17, the horizontal position refers to a position in which the ramp assembly 20 is substantially parallel to the housing 11 as the motor 51 of the hinge drive unit 50 rotates the hinge shaft 35 and the hinge lug 38 clockwise. Referring to FIG. 18, the inclined position refers to a position in which the ramp assembly 20 is inclined at a predetermined angle with respect to the housing 11 as the motor 51 of the hinge drive unit 50 rotates the hinge shaft 35 and the hinge lug 38 counterclockwise.

Referring to FIGS. 17 and 18, in a state in which the ramp assembly 20 is fully deployed from the housing 11 by the moving body 31 and the moving mechanism 40, the motor 51 of the hinge drive unit 50 may rotate the hinge shaft 35 and the hinge lug 38 so that the hinge stopper 39 may come into contact with or be spaced apart from the moving body 31 of the hinge mechanism 30. That is, the hinge stopper 39 may come into contact with or be spaced apart from the moving body 31 of the hinge mechanism 30 according to the rotation direction of the hinge shaft 35.

Referring to FIG. 17, when the ramp assembly 20 is moved to the horizontal position by the hinge drive unit 50 in a state in which the ramp assembly 20 is fully deployed from the housing 11 by the moving body 31 and the moving mechanism 40, the hinge stopper 39 may come into contact with the moving body 31. When the hinge stopper 39 comes into contact with the moving body 31 of the hinge mechanism 30, a current applied to the motor 51 of the hinge drive unit 50 may be higher than a threshold. Specifically, when the hinge stopper 39 comes into contact with the moving body 31 of the hinge mechanism 30, the controller may determine that the current applied to the motor 51 is higher than the threshold. When the current applied to the motor 51 is higher than the threshold, the controller may block the current applied to the motor 51 to thereby stop the motor 51.

Referring to FIG. 18, as the motor 51 of the hinge drive unit 50 rotates the hinge shaft 35 counterclockwise in a state in which the ramp assembly 20 is fully deployed from the housing 11, the ramp assembly 20 may be moved to the inclined position by the hinge drive unit 50, and the hinge stopper 39 may be sufficiently spaced apart from the moving body 31.

Referring to FIGS. 5 and 6, the ramp apparatus 10 for a vehicle according to an exemplary embodiment of the present disclosure may include the moving mechanism 4*o* allowing the moving body 31 of the hinge mechanism 30 and the ramp assembly 20 to move. In particular, the moving mechanism 40 may allow the ramp assembly 20 to move between the stowed position (see FIG. 5) and the deployed position (see FIG. 6).

The moving mechanism 40 may include a drive sprocket 41 adjacent to the trailing end portion of the housing 11, a driven sprocket 42 adjacent to the leading end portion of the housing 11, a chain 43 connecting the drive sprocket 41 and the driven sprocket 42, and the motor 45 driving the drive sprocket 41.

The drive sprocket 41 may be rotatably mounted adjacent to the trailing end portion of the housing 11 through a mounting bracket 46. The drive sprocket 41 may be rotated by the motor 45. The motor 45 may be a bidirectional motor operating clockwise and counterclockwise, and the drive sprocket 41 may rotate clockwise and counterclockwise by the operation of the motor 45.

Figure 10:
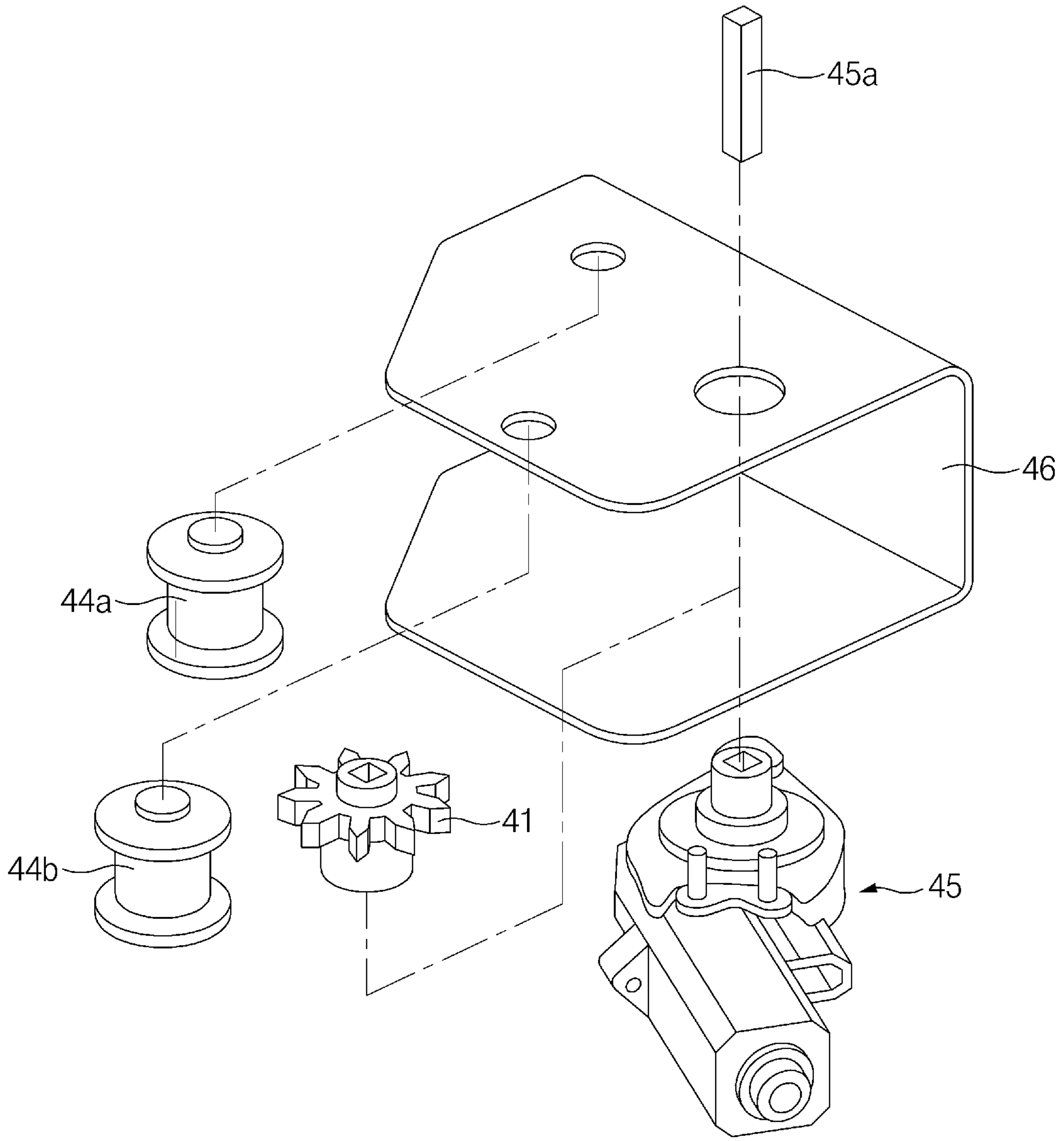
FIG. 10 illustrates an exploded perspective view of the motor, the drive sprocket, and the tension pulleys of the moving mechanism which are separated from the mounting bracket in the ramp apparatus illustrated in FIG. 9.
Figure 11:
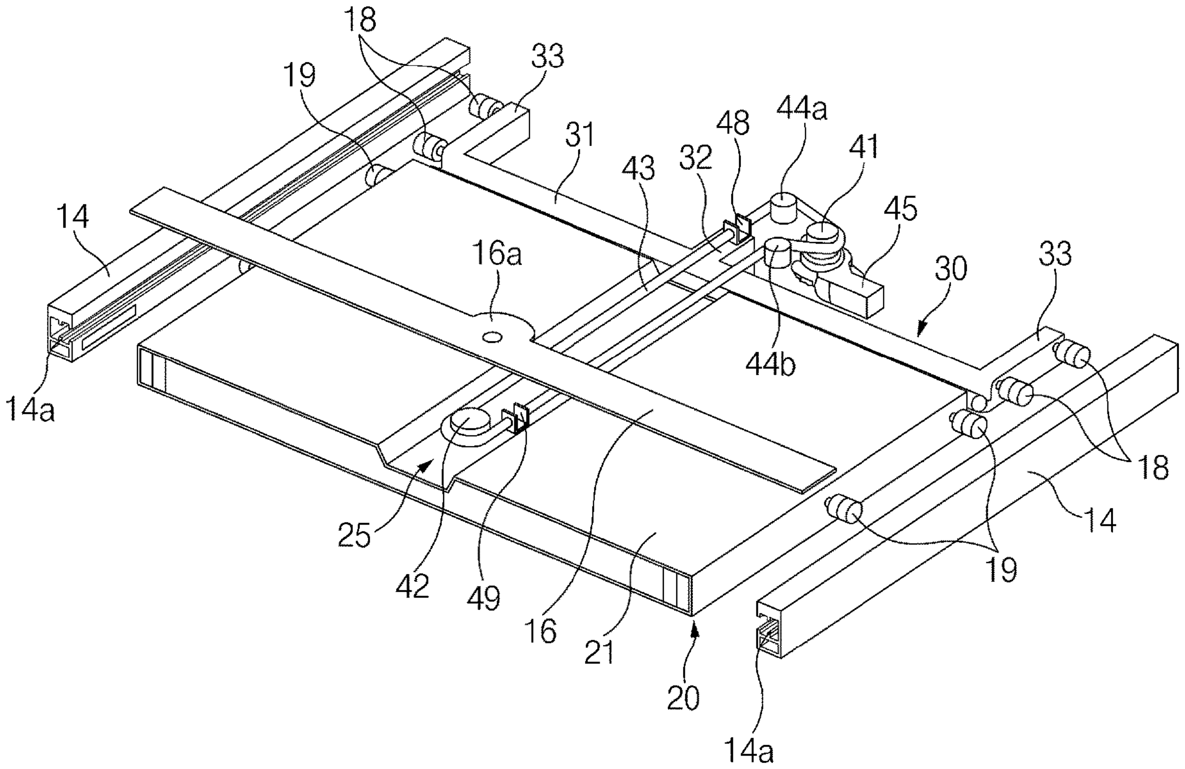
FIG. 11 illustrates an exploded perspective view of a ramp assembly, a hinge mechanism, and a pair of guide rails in a ramp apparatus for a vehicle according to an exemplary embodiment of the present disclosure.
Figure 12:
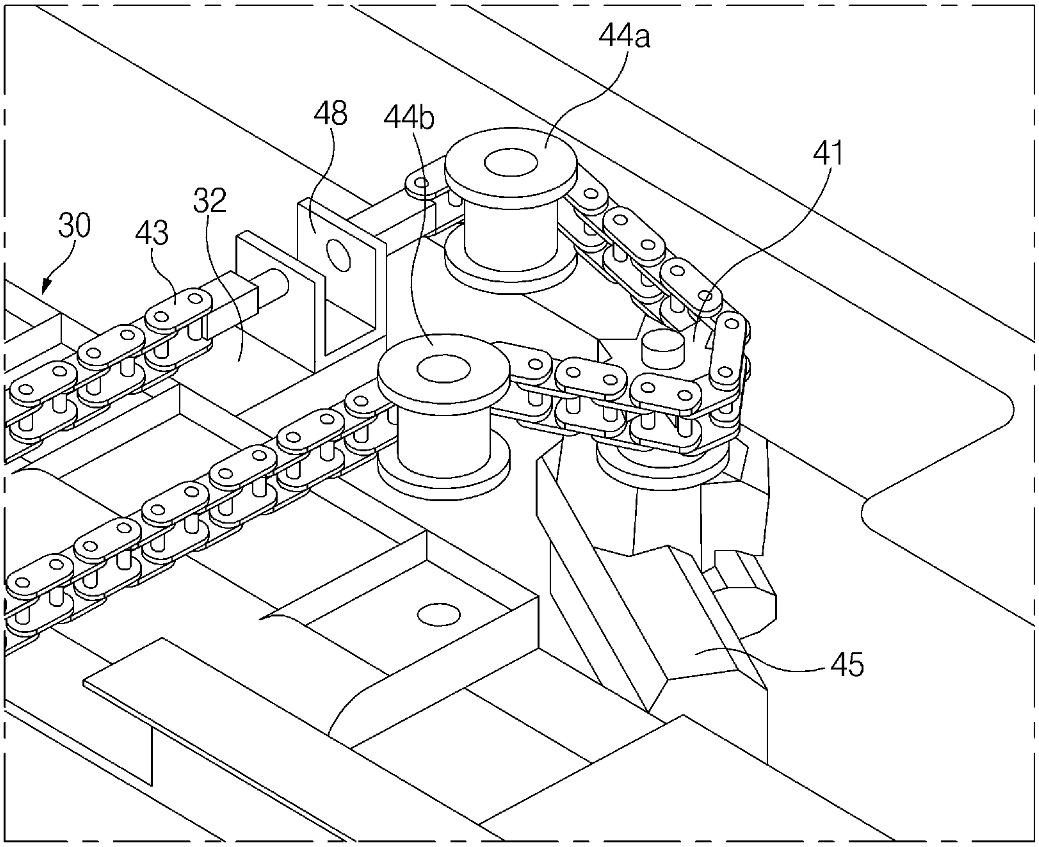
FIG. 12 illustrates a perspective view of a drive sprocket, a motor, tension pulleys, a chain, and a chain attachment of a moving mechanism in a ramp apparatus for a vehicle according to an exemplary embodiment of the present disclosure.

Referring to FIG. 10, the motor 45 may have an output shaft 45*a*, and the output shaft 45*a* of the motor 45 may be fixedly fitted into a hole of the drive sprocket 41 so that the motor 45 may directly rotate the drive sprocket 41. The output shaft 45*a* may be a rectangular bar, and the drive sprocket 41 may have a rectangular hole matching the output shaft 45*a*. The output shaft 45*a* of the motor 45 may be fitted into the hole of the drive sprocket 41 so that the output shaft 45*a* may be fixedly joined to the hole of the drive sprocket 41. Accordingly, as the motor 45 operates, the drive sprocket 41 may rotate clockwise and counterclockwise.

Figure 8:
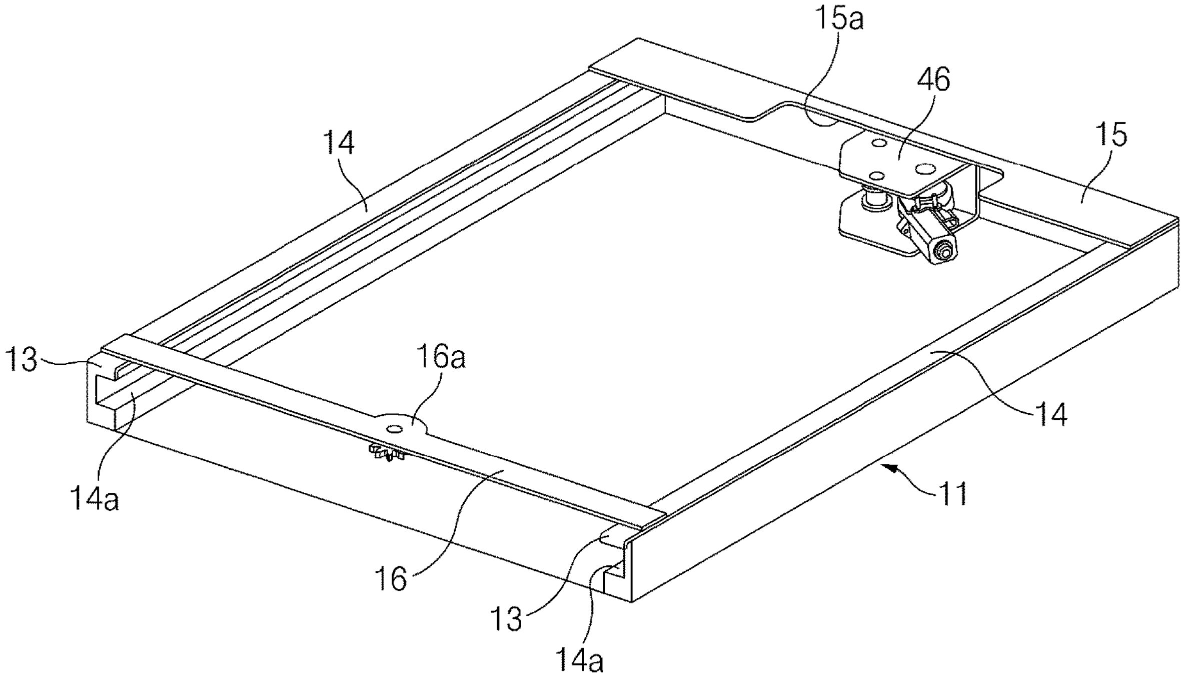
FIG. 8 illustrates a perspective view of a state in which a mounting bracket of a moving mechanism is fixed to a lower case of a housing in a ramp apparatus for a vehicle according to an exemplary embodiment of the present disclosure.

The drive sprocket 41 may be mounted in the lower case 11*a* of the housing 11 through the mounting bracket 46. Referring to FIGS. 5, 6, and 8, the mounting bracket 46 may be mounted adjacent to the trailing end portion of the housing 11. The first support bracket 15 may have a recess 15*a* in which the mounting bracket 46 is received and by which the mounting bracket 46 is prevented from interfering with the first support bracket 15.

Figure 9:
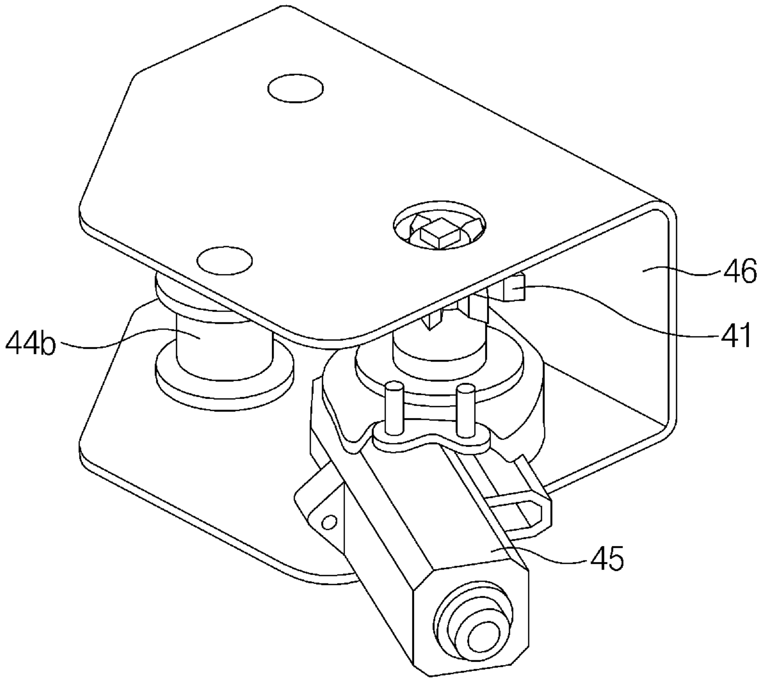
FIG. 9 illustrates a perspective view of a state in which a motor, a drive sprocket, and tension pulleys of a moving mechanism are mounted to a mounting bracket in a ramp apparatus for a vehicle according to an exemplary embodiment of the present disclosure.

Referring to FIGS. 9 and 10, the mounting bracket 46 may have a U-shaped cross section defining a cavity, and the drive sprocket 41 and the motor 45 may be mounted in the cavity of the mounting bracket 46. Accordingly, the drive sprocket 41 and the motor 45 may be easily mounted in the lower case 11*a* of the housing 11 through the mounting bracket 46.

The moving mechanism 40 may further include tension pulleys 44*a* and 44*b* guiding the movement of the chain 43 and tensioning the chain 43. Referring to FIG. 10, the two tension pulleys 44*a* and 44*b* may be additionally mounted on the mounting bracket 46. The two tension pulleys 44*a* and 44*b* may be disposed adjacent to the drive sprocket 41 and the motor 45 in the cavity of the mounting bracket 46. As the tension pulleys 44*a* and 44*b* maintain the tension of the chain 43, the degree of freedom in position of the motor 45 and sizes of the sprockets 41 and 42 may be given.

Figure 32:
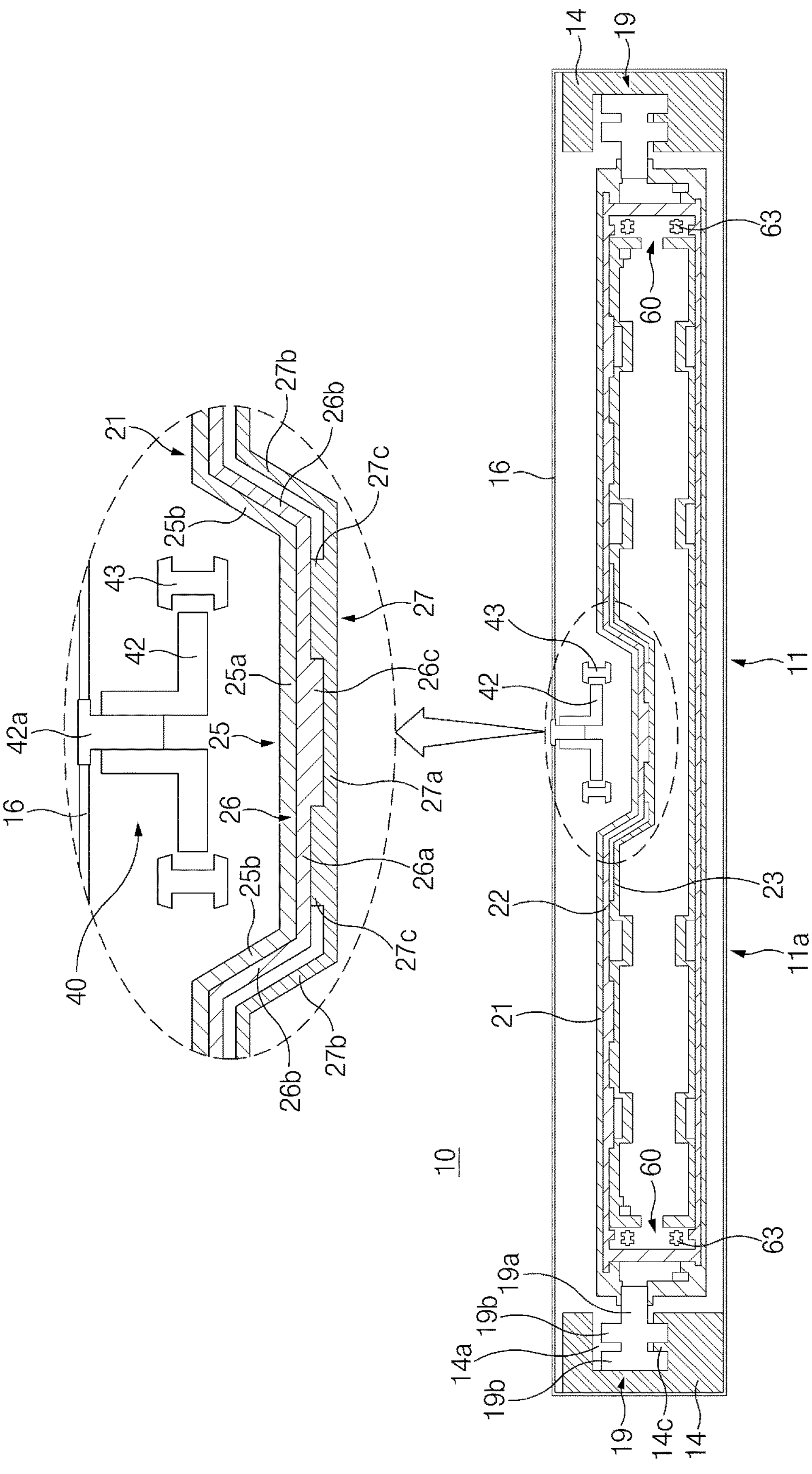
FIG. 32 illustrates a cross-sectional view, taken along line I-I of FIG. 5.

The driven sprocket 42 may be disposed adjacent to the leading end portion of the housing 11, and the driven sprocket 42 may be rotatably mounted on the second support bracket 16 through a shaft 42*a* (see FIG. 32). Referring to FIG. 1*i*, the second support bracket 16 may have a mounting portion 16*a* provided on a central portion thereof, and the mounting portion 16*a* may be greater than an outer diameter of the driven sprocket 42.

The chain 43 may engage the drive sprocket 41 and the driven sprocket 42, and wrap the drive sprocket 41 and the driven sprocket 42 so that a movement path of the chain 43 may be defined by the drive sprocket 41 and the driven sprocket 42. The tension pulleys 44*a* and 44*b* may be disposed adjacent to the drive sprocket 41 to thereby guide the movement path of the chain 43 and subject the chain 43 to tension.

The chain 43 may include a chain attachment 48, and a chain stopper 49 spaced apart from the chain attachment 48. The chain attachment 48 and the chain stopper 49 may be spaced apart from each other in a diagonal direction on the movement path of the chain 43.

An upper portion of the chain attachment 48 may be connected to the chain 43. When the chain 43 moves, the chain attachment 48 may move in the same direction as the movement direction of the chain 43. A lower portion of the chain attachment 48 may be fixed to the moving body 31 of the hinge mechanism 30 using fasteners, welding, and/or the like. Accordingly, the chain attachment 48 may be connected to the ramp assembly 20 through the moving body 31. As the chain 43 is moved by the motor 45, the moving body 31 and the ramp assembly 20 may move in the same direction as the movement direction of the chain attachment 48.

When the drive sprocket 41 is rotated clockwise by the motor 45, the chain 43 may move according to the clockwise rotation of the drive sprocket 41. As illustrated in FIG. 5, the chain attachment 48 and the moving body 31 may move close to the drive sprocket 41, and accordingly the ramp assembly 20 may be fully stowed in the housing 11.

When the drive sprocket 41 is rotated counterclockwise by the motor 45, the chain 43 may move according to the counterclockwise rotation of the drive sprocket 41. As illustrated in FIG. 6, the chain attachment 48 and the moving body 31 may move close to the driven sprocket 42, and accordingly the ramp assembly 20 may be fully deployed from the housing 11.

The chain stopper 49 may be connected between chain elements of the chain 43. When the chain 43 moves, the chain stopper 49 may move in the same direction as the movement direction of the chain 43. Referring to FIG. 5, when the chain attachment 48 is relatively close to the drive sprocket 41, the chain stopper 49 may be sufficiently spaced apart from the mounting bracket 46. Referring to FIG. 6, when the chain attachment 48 is relatively close to the driven sprocket 42, the chain stopper 49 may come into contact with the mounting bracket 46. When the chain stopper 49 comes into contact with the mounting bracket 46, a current applied to the motor 45 of the moving mechanism 40 may be higher than a threshold. Specifically, when the chain stopper 49 comes into contact with the mounting bracket 46, the controller may determine that the current applied to the motor 45 is higher than the threshold. When the current applied to the motor 45 is higher than the threshold, the controller may block the current applied to the motor 45 to thereby stop the motor 45. Thus, the moving body 31 may be prevented from being separated from the housing 11.

Figure 19:
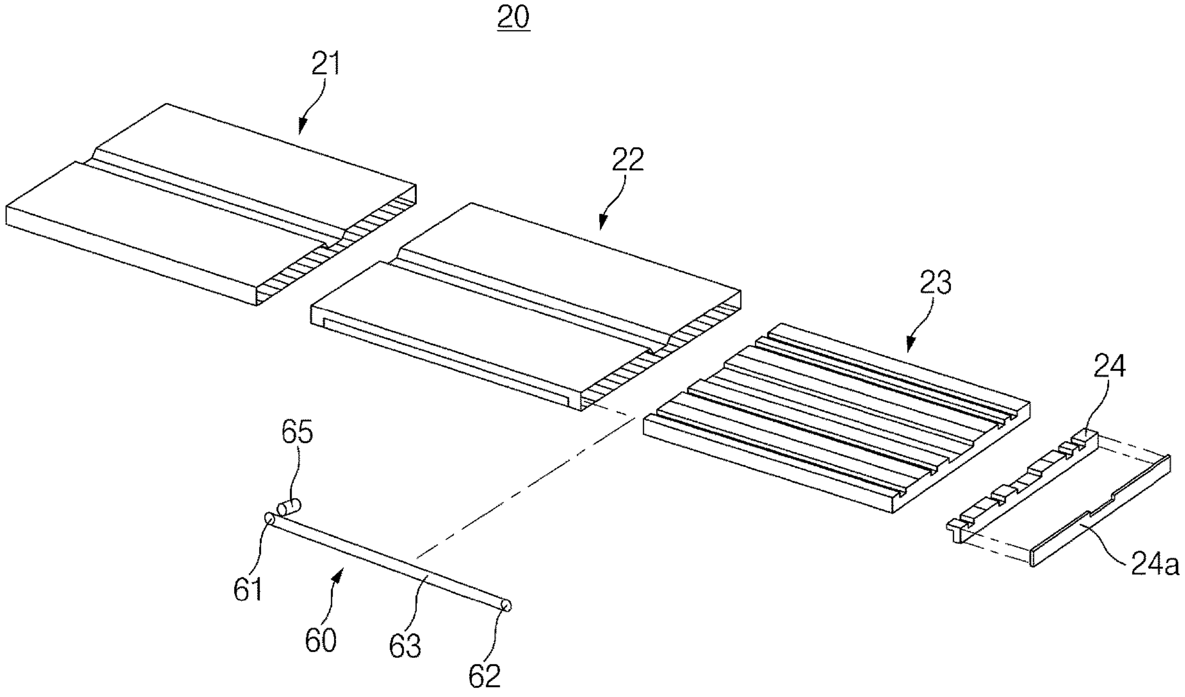
FIG. 19 illustrates an exploded perspective view of a ramp assembly in a ramp apparatus for a vehicle according to an exemplary embodiment of the present disclosure.

Referring to FIG. 19, the first ramp platform 21, the second ramp platform 22, and the third ramp platform 23 may have a rectangular parallelepiped shape of which both ends are open. For example, each of the first ramp platform 21, the second ramp platform 22, and the third ramp platform 23 may be an aluminum extruded product. Each of the first ramp platform 21, the second ramp platform 22, and the third ramp platform 23 may have a cavity defined therein. In particular, the first ramp platform 21 may have the largest size, and the size of the second ramp platform 22 may be less than the size of the first ramp platform 21. Specifically, the length, width, and thickness of the first ramp platform 21 may be greater than the length, width, and thickness of the second ramp platform 22, and the second ramp platform 22 may be fully stowed in the first ramp platform 21. The size of the third ramp platform 23 may be less than the size of the second ramp platform 22. Specifically, the length, width, and thickness of the second ramp platform 22 may be greater than the length, width, and thickness of the third ramp platform 23, and the third ramp platform 23 may be fully stowed in the second ramp platform 22.

Referring to FIGS. 5 and 6, the first ramp platform 21 may include a plurality of guide rollers 19 rolling along the pair of guide rails 14. The plurality of guide rollers 19 may be rotatably mounted on both opposing sidewalls of the first ramp platform 21, and each guide roller 19 may roll along the guide passage 14*a* of the corresponding guide rail 14. As the plurality of guide rollers 19 roll along the pair of guide rails 14, the first ramp platform 21 may move in the internal space of the housing 11.

Referring to FIG. 32, each guide roller 19 may include a roller shaft 19*a*, and two roller members 19*b* rotatably mounted on the roller shaft 19*a*. The two roller members 19*b* may be spaced apart from each other in a longitudinal direction of the roller shaft 19*a*. The guide rail 14 may have the guide passage 14*a* guiding the movements of the roller members 19*b*, and the splitting projection 14*c* may divide the guide passage 14*a* into two passages.

Referring to FIG. 19, the leading opening of the third ramp platform 23 may be covered with a leading cover 24, and the leading cover 24 may be made of a synthetic resin material or an aluminum material. The leading cover 24 may be mounted on the third ramp platform 23 using fasteners and/or the like. A rubber cover 24*a* may be mounted on the third ramp platform 23 to fully cover the leading cover 24 and the leading opening of the third ramp platform 23.

Figure 22:
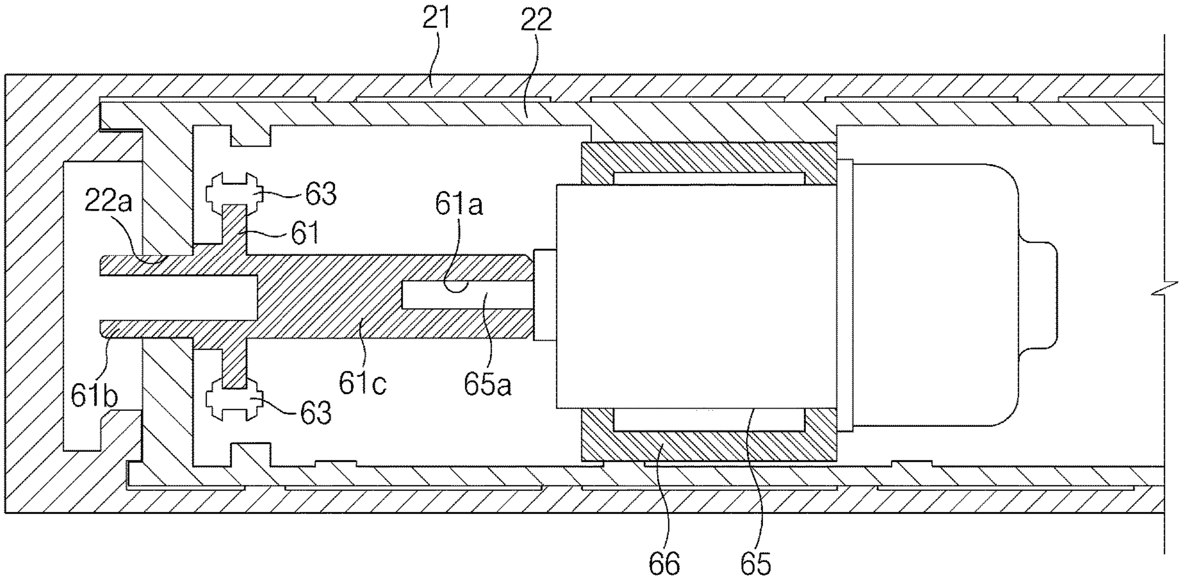
FIG. 22 illustrates a cross-sectional view, taken along line B-B of FIG. 21.
Figure 24:
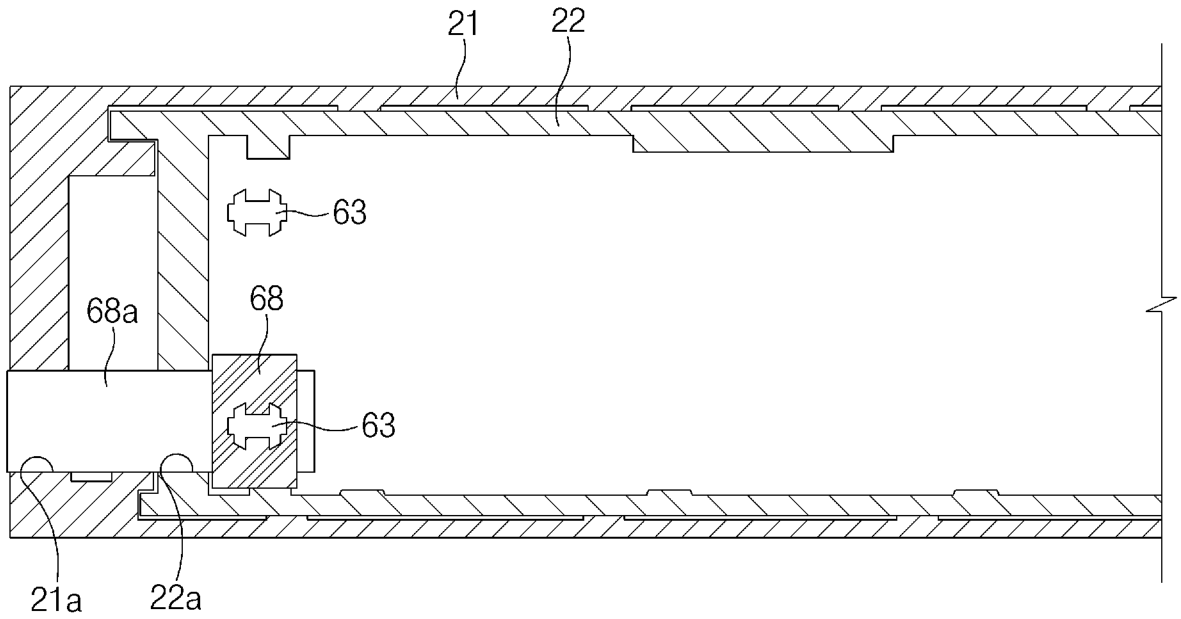
FIG. 24 illustrates a cross-sectional view, taken along line D-D of FIG. 21.

Referring to FIGS. 22 and 24, a guide structure may be provided between an interior surface of the first ramp platform 21 and an exterior surface of the second ramp platform 22. Accordingly, an exterior surface of the second ramp platform 22 may partially contact an interior surface of first ramp platform 21 so that the movement of the second ramp platform 22 may be guided with respect to the first ramp platform 21 through the guide structure.

Figure 23:
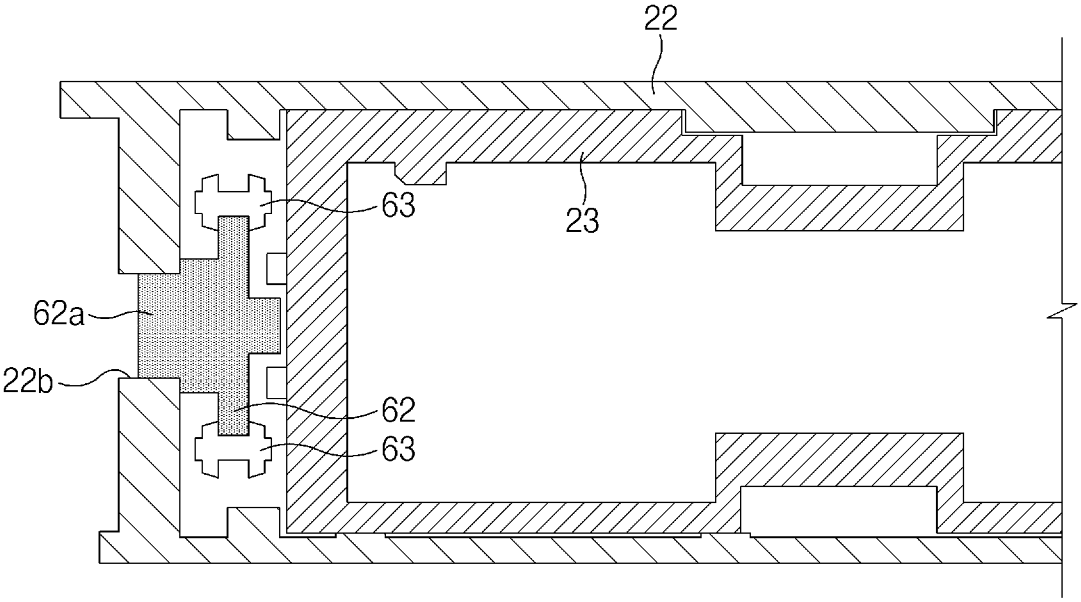
FIG. 23 illustrates a cross-sectional view, taken along line C-C of FIG. 21.
Figure 25:
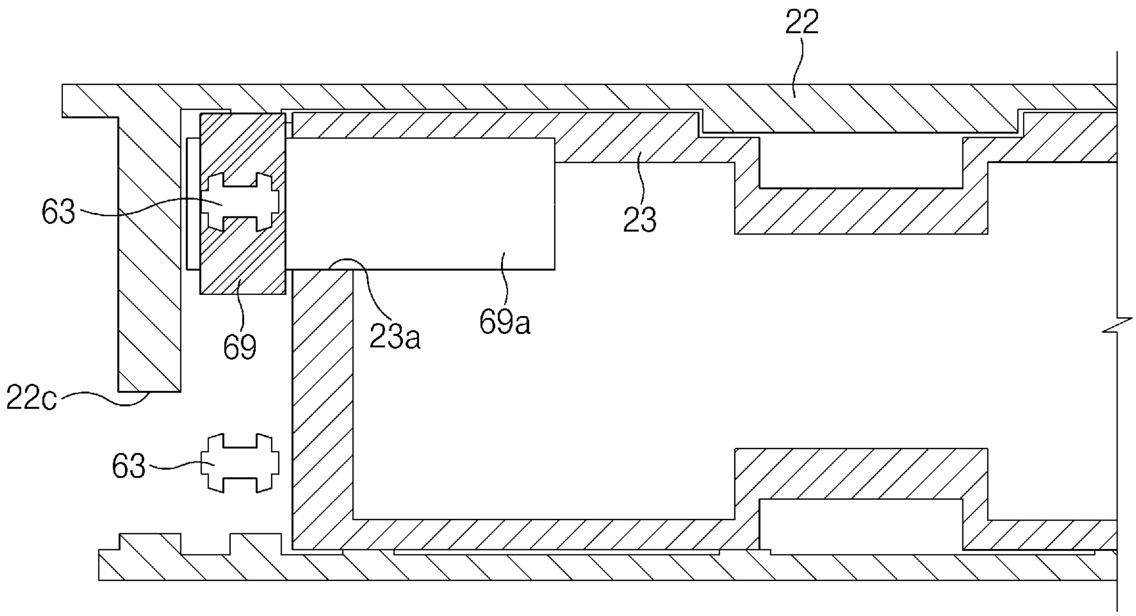
FIG. 25 illustrates a cross-sectional view, taken along line E-E of FIG. 21.

Referring to FIGS. 23 and 25, a guide structure may be provided between the interior surface of the second ramp platform 22 and an exterior surface of the third ramp platform 23. Accordingly, an exterior surface of the third ramp platform 23 may partially contact the interior surface of the second ramp platform 22 so that the movement of the third ramp platform 23 may be guided with respect to the second ramp platform 22 through the guide structure.

As illustrated in FIGS. 17 and 18, after the ramp assembly 20 is fully deployed from the housing 11, the first ramp platform 21 may pivot by the hinge mechanism 30 since the first ramp platform 21 is connected to the housing 11 through the hinge mechanism 30, but the first ramp platform 21 may not move horizontally by a drive mechanism 60. Accordingly, while the first ramp platform 21 does not move relative to the second ramp platform 22, the second ramp platform 22 may be able to move relative to the first ramp platform 21, and the third ramp platform 23 may be able to move relative to the second ramp platform 22.

The ramp apparatus 10 according to an exemplary embodiment of the present disclosure may include the drive mechanism 60 allowing the ramp platforms of the ramp assembly 20 to be extended and retracted. Specifically, the drive mechanism 60 may be configured to move the second ramp platform 22 telescopically with respect to the first ramp platform 21, and move the third ramp platform 23 telescopically with respect to the second ramp platform 22.

Referring to FIG. 19, the drive mechanism 60 may be disposed in the cavity of the second ramp platform 22. The drive mechanism 60 may be a chain drive mechanism including a drive sprocket 61, a driven sprocket 62 spaced apart from the drive sprocket 61, a chain 63 connecting the drive sprocket 61 and the driven sprocket 62, and a motor 65 driving the drive sprocket 61.

The drive sprocket 61 and the driven sprocket 62 may be spaced apart from each other along the length of the second ramp platform 22 in the cavity of the second ramp platform 22. The drive sprocket 61 may be located in the trailing end portion of the second ramp platform 22, and the driven sprocket 62 may be located in the leading end portion of the second ramp platform 22.

Figure 20:
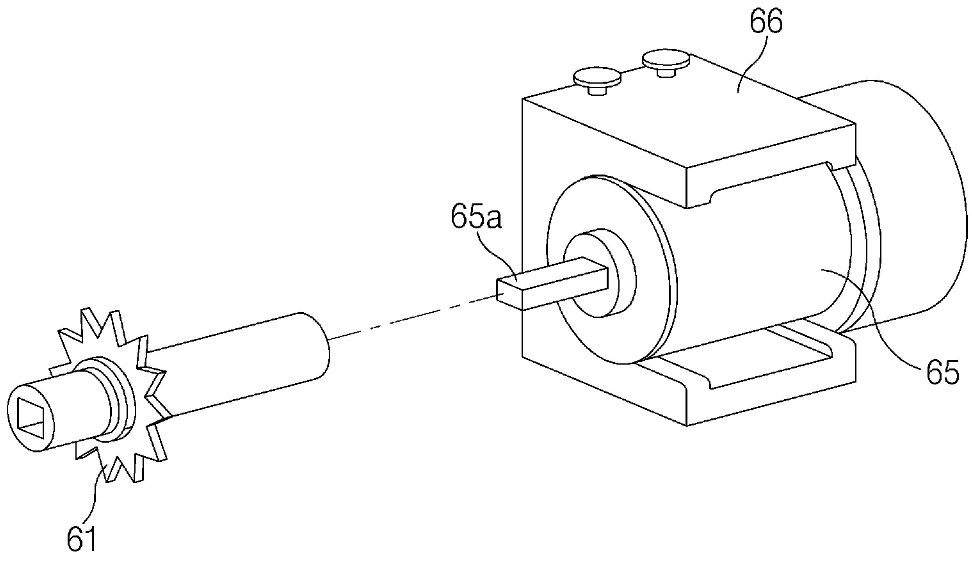
FIG. 20 illustrates an exploded perspective view of a drive sprocket and a motor of a drive mechanism in a ramp apparatus for a vehicle according to an exemplary embodiment of the present disclosure.

Referring to FIG. 20, the motor 65 may be attached to a mounting bracket 66, and the mounting bracket 66 may have a U-shaped cross section defining a cavity therein. The motor 65 may be firmly attached to the cavity of the mounting bracket 66. The motor 65 may have an output shaft 65*a* extending toward the drive sprocket 61, and the output shaft 65*a* of the motor 65 may be directly connected to the drive sprocket 61.

Referring to FIG. 22, the motor 65 may be mounted on the trailing end portion of the second ramp platform 22 through the mounting bracket 66. The motor 65 may have the output shaft 65*a*, and the drive sprocket 61 may have a hole 61*a*. The output shaft 65*a* of the motor 65 may be a rectangular bar (see FIG. 20). The hole 61*a* of the drive sprocket 61 may be a rectangular hole matching the output shaft 65*a*, and the output shaft 65*a* of the motor 65 may be directly fitted into the hole 61*a* of the drive sprocket 61. The motor 65 may be configured to operate clockwise and counterclockwise. The motor 65 may directly rotate the drive sprocket 61 clockwise and counterclockwise.

Referring to FIG. 22, the drive sprocket 61 may include a first shaft 61*b* extending toward a sidewall of the second ramp platform 22, and a second shaft 61*c* extending toward the motor 65. A through hole 22*a* may be formed in the sidewall of the second ramp platform 22, and the first shaft 61*b*, may be rotatably mounted in the through hole 22*a* of the second ramp platform 22. Accordingly, the drive sprocket 61 may be rotatably supported with respect to the trailing end portion of the second ramp platform 22, and the drive sprocket 61 may be rotated by the motor 65. The hole 61*a* of the drive sprocket 61 may be defined in the second shaft 61*c*.

Referring to FIG. 23, the driven sprocket 62 may have a shaft 62*a* extending toward the sidewall of the second ramp platform 22. A through hole 22*b* may be formed in the sidewall of the second ramp platform 22, and the shaft 62*a* may be rotatably mounted in the through hole 22*b* of the second ramp platform 22.

The chain 63 may engage the drive sprocket 61 and the driven sprocket 62, and wrap the drive sprocket 61 and the driven sprocket 62 so that a movement path of the chain 63 may be defined by the drive sprocket 61 and the driven sprocket 62.

Referring to FIG. 21, the chain 63 may include a first chain attachment 68 and a second chain attachment 69 spaced apart from the first chain attachment 68.

Figure 29:
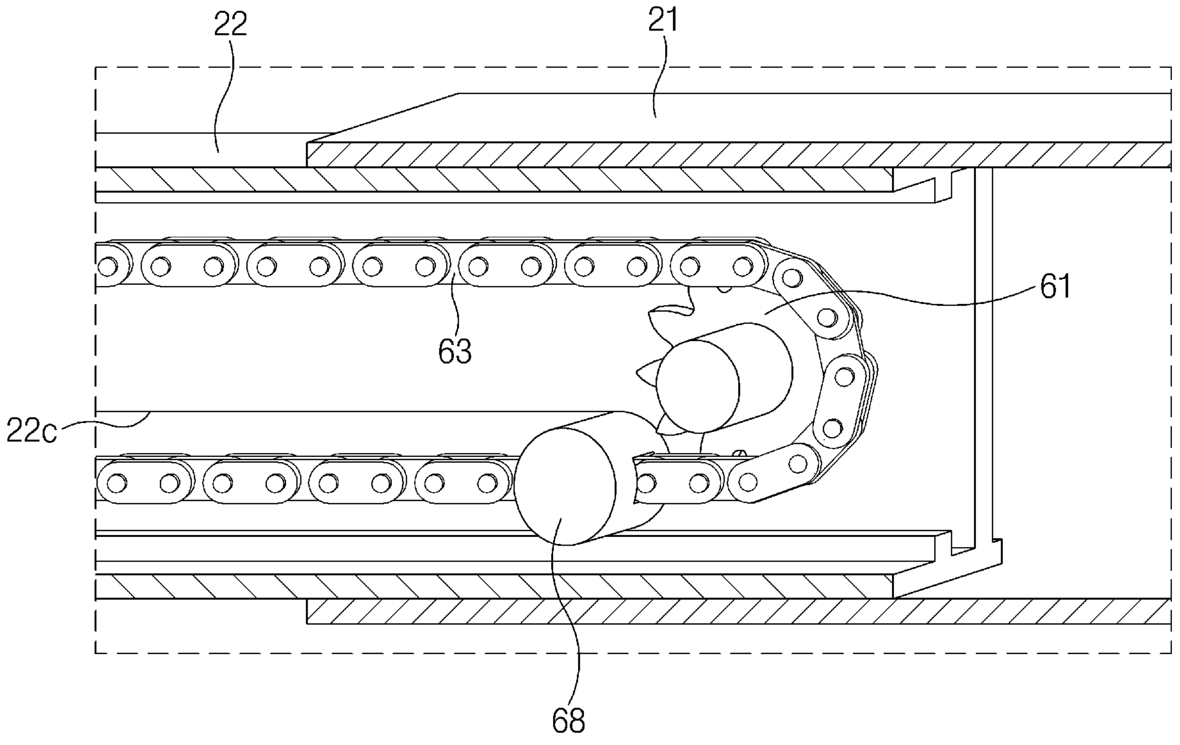
FIG. 29 illustrates a cross-sectional view, taken along line F-F of FIG. 28.

Referring to FIGS. 21 and 29, the second ramp platform 22 may have a slot 22C provided in at least one sidewall thereof, and a portion of the first chain attachment 68 may move through the slot 22C. The slot 22C may extend along the length of the second ramp platform 22. The first chain attachment 68 may be guided along the slot 22C of the second ramp platform 22. Referring to FIGS. 21 and 27, a leading end portion of the slot 22C may be adjacent to the leading end portion of the second ramp platform 22 and the driven sprocket 62, and a trailing end portion of the slot 22C may be adjacent to the trailing end portion of the second ramp platform 22 and the drive sprocket 61.

Referring to FIGS. 24 and 29, the first chain attachment 68 may be fixed to at least one chain element of the chain 63. At least one chain element of the chain 63 may be fitted into the first chain attachment 68 so that the first chain attachment 68 may be fixed to a portion of the chain 63. Referring to FIG. 24, the first chain attachment 68 may have a projection 68*a* extending from its one side toward the sidewall of the first ramp platform 21, and a hole 21*a* may be formed in the sidewall of the first ramp platform 21 adjacent to the leading end portion of the first ramp platform 21. A free end portion of the projection 68*a* may be fixedly fitted into the hole 21*a* of the first ramp platform 21 so that the first chain attachment 68 may be fixed to a portion of the first ramp platform 21 adjacent to the leading end portion of the first ramp platform 21. The projection 68*a* may be guided through the slot 22C of the second ramp platform 22.

Figure 30:
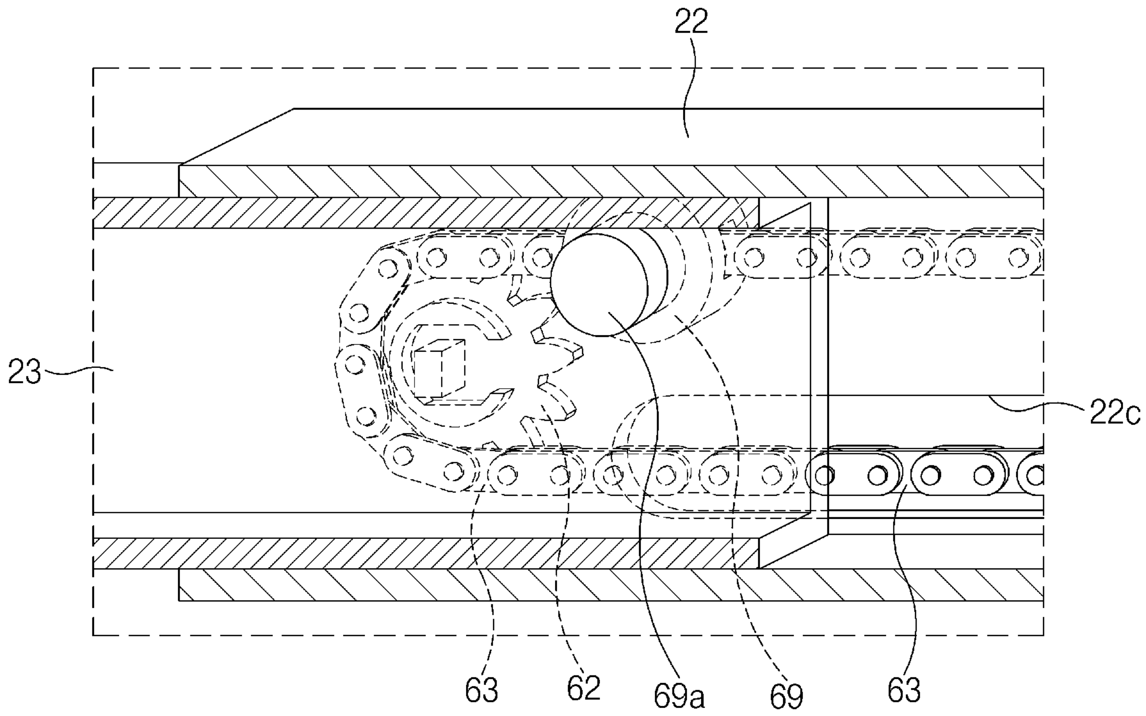
FIG. 30 illustrates a cross-sectional view, taken along line G-G of FIG. 28.

Referring to FIGS. 25 and 30, the second chain attachment 69 may be fixed to at least one chain element of the chain 63. At least one chain element of the chain 63 may be fitted into the second chain attachment 69 so that the second chain attachment 69 may be fixed to a portion of the chain 63. Referring to FIG. 25, the second chain attachment 69 may have a projection 69*a* extending from its one side toward the sidewall of the third ramp platform 23, and a hole 23*a* may be formed in the sidewall of the third ramp platform 23 adjacent to the trailing end portion of the third ramp platform 23. A free end portion of the projection 69*a* may be fixedly fitted into the hole 23*a* of the third ramp platform 23 so that the second chain attachment 69 may be fixed to a portion of the third ramp platform 23 adjacent to the trailing end portion of the third ramp platform 23. The second chain attachment 69 may be spaced apart from the first chain attachment 68.

Referring to FIG. 21, the second ramp platform 22 may be fully stowed in the cavity of the first ramp platform 21, and the third ramp platform 23 may be fully stowed in the cavity of the second ramp platform 22 so that the ramp assembly 20 may be fully retracted. When the ramp assembly 20 is fully retracted, the length of the ramp assembly 20 may be minimized. In this state, the first chain attachment 68 may be located adjacent to the driven sprocket 62 in a lower section of the chain 63, and the second chain attachment 69 may be located adjacent to the drive sprocket 61 in an upper section of the chain 63. The first chain attachment 68 and the second chain attachment 69 may be spaced apart from each other in a diagonal direction on the movement path of the chain 63.

Figure 31:
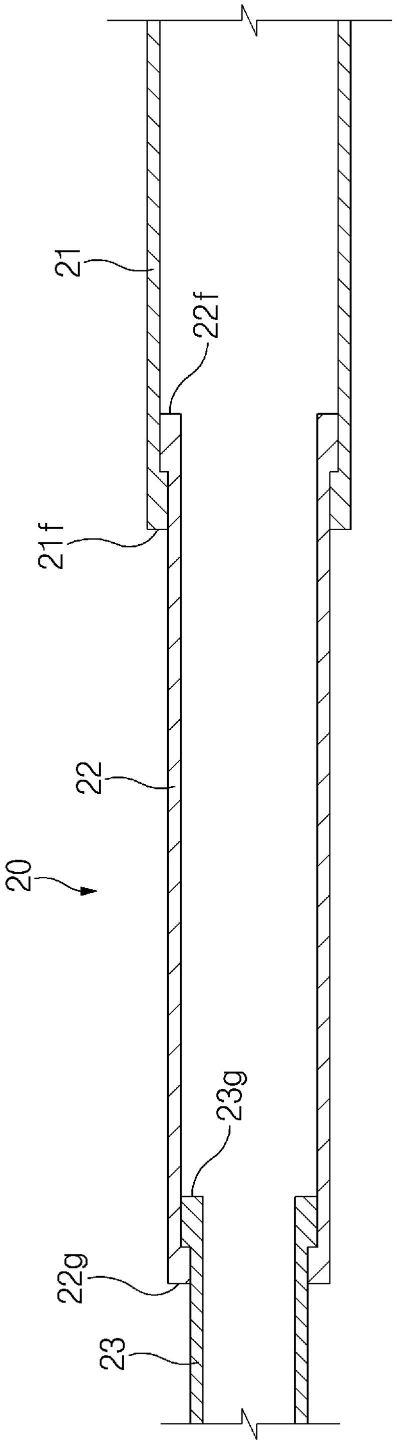
FIG. 31 illustrates a cross-sectional view, taken along line H-H of FIG. 28.

Referring to FIG. 31, the first ramp platform 21 may have a leading stop shoulder 21*f* provided on the leading end portion thereof, and the leading stop shoulder 21*f* may protrude toward the second ramp platform 22. The second ramp platform 22 may have a trailing stop shoulder 22*f* provided on the trailing end portion thereof, and the trailing stop shoulder 22*f* may protrude toward the first ramp platform 21. When the second ramp platform 22 is fully extended out from the first ramp platform 21, the trailing stop shoulder 22*f* of the second ramp platform 22 may be engaged with the leading stop shoulder 21*f* of the first ramp platform 21, and thus the second ramp platform 22 may be prevented from being separated from the first ramp platform 21.

Referring to FIG. 31, the second ramp platform 22 may have a leading stop shoulder 22*g* provided on the leading end portion thereof, and the leading stop shoulder 22*g* may protrude toward the third ramp platform 23. The third ramp platform 23 may have a trailing stop shoulder 23*g* provided on the trailing end portion thereof, and the trailing stop shoulder 23*g* may protrude toward the second ramp platform 22. When the third ramp platform 23 is fully extended out from the second ramp platform 22, the trailing stop shoulder 23*g* of the third ramp platform 23 may be engaged with the leading stop shoulder 22*g* of the second ramp platform 22, and thus the third ramp platform 23 may be prevented from being separated from the second ramp platform 22.

After the leading end portion of the third ramp platform 23 is inserted into the cavity of the second ramp platform 22 through the trailing end portion of the second ramp platform 22, the leading end portion of the second ramp platform 22 may be inserted into the cavity of the first ramp platform 21 through the trailing end portion of the first ramp platform 21 so that the first ramp platform 21, the second ramp platform 22, and the third ramp platform 23 may be easily assembled.

Figure 26:
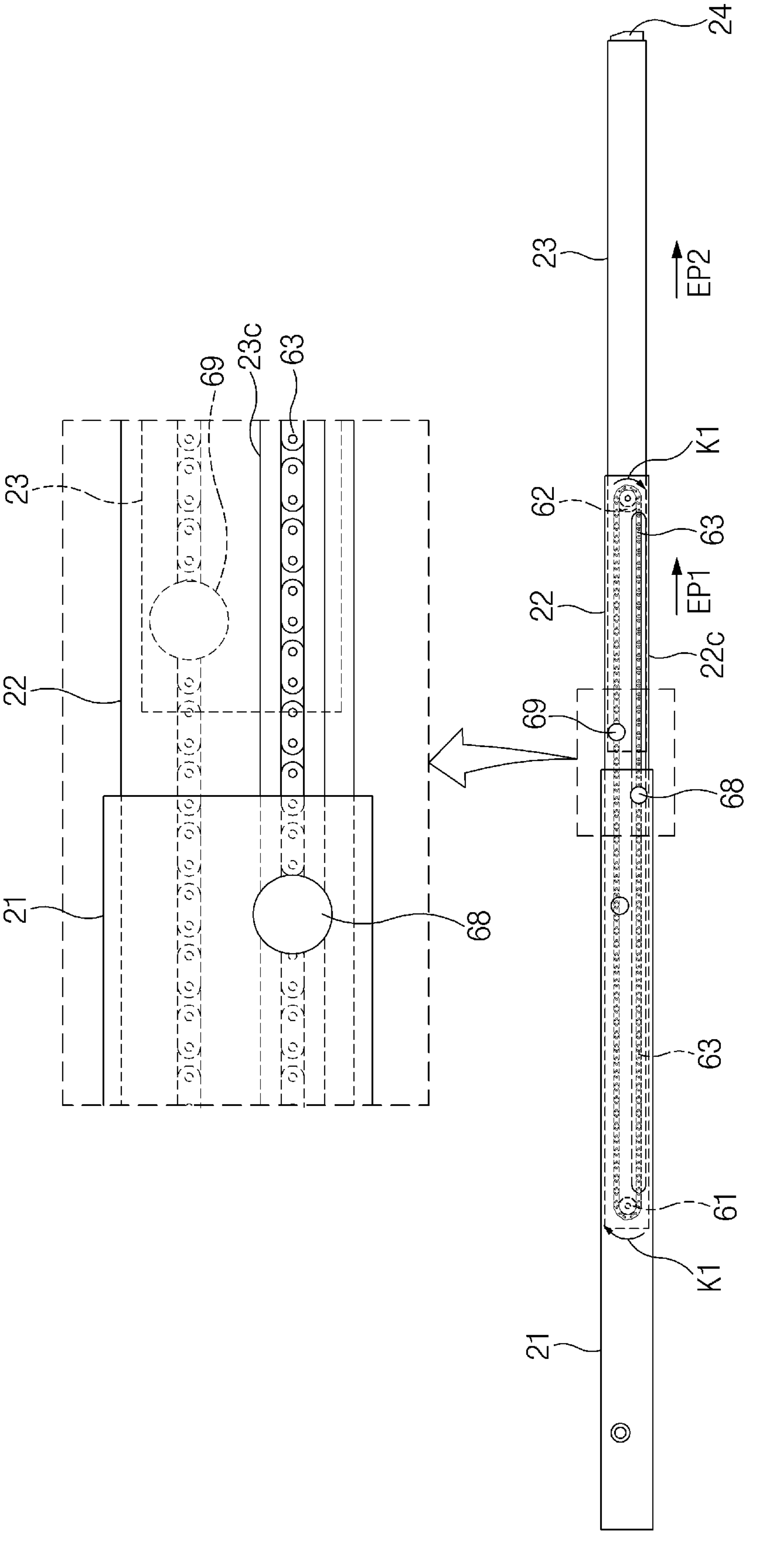
FIG. 26 illustrates a side view of a state in which ramp platforms of a ramp assembly are partially extended in a ramp apparatus for a vehicle according to an exemplary embodiment of the present disclosure.

Referring to FIG. 26, as the motor 65 operates clockwise, the drive sprocket 61 and the driven sprocket 62 may rotate clockwise (see direction indicated by arrow Ki), and accordingly the chain 63 may move in the same direction as the rotation direction of the drive sprocket 61 and the rotation direction of the driven sprocket 62. As the chain 63 moves, the first chain attachment 68 may move in the same direction as the movement direction of the chain 63.

Referring to FIG. 26, when the first chain attachment 68 moves toward the drive sprocket 61 by the movement of the chain 63, the first ramp platform 21 may not move relative to the second ramp platform 22, but the second ramp platform 22 may be able to move relative to the first ramp platform 21. Accordingly, by a reaction to the movement of the first chain attachment 68, the second ramp platform 22 may move toward the extended position (see direction indicated by arrow EP1 of FIG. 26) in which the second ramp platform 22 is fully extended out from the first ramp platform 21.

Referring to FIG. 26, when the second chain attachment 69 moves toward the driven sprocket 62 by the movement of the chain 63, the second ramp platform 22 may not move relative to the third ramp platform 23, but the third ramp platform 23 may be able to move relative to the second ramp platform 22. Accordingly, the third ramp platform 23 may move along the movement direction of the second chain attachment 69 toward the extended position (see direction indicated by arrow EP2 of FIG. 26) in which the third ramp platform 23 is fully extended out from the second ramp platform 22.

Referring to FIG. 27, as the first chain attachment 68 moves close to the drive sprocket 61, the second ramp platform 22 may be fully extended out from the first ramp platform 21, and as the second chain attachment 69 moves close to the driven sprocket 62, the third ramp platform 23 may be fully extended out from the second ramp platform 22 so that the ramp assembly 20 may be fully extended. When the ramp assembly 20 is fully extended, the length of the ramp assembly 20 may be maximized.

Referring to FIGS. 27 and 29, when the third ramp platform 23 is fully extended out from the second ramp platform 22, the first chain attachment 68 may move to the trailing end portion of the slot 22C by the movement of the chain 63 so that the first chain attachment 68 may come into contact with the trailing end portion of the slot 22C. When the first chain attachment 68 comes into contact with the trailing end portion of the slot 22C, a current applied to the motor 65 of the drive mechanism 60 may be higher than a threshold. Specifically, when the first chain attachment 68 comes into contact with the trailing end portion of the slot 22C, the controller may determine that the current applied to the motor 65 is higher than the threshold. When the current applied to the motor 65 is higher than the threshold, the controller may block the current applied to the motor 65 to thereby stop the motor 65.

Referring to FIG. 31, as the second ramp platform 22 is fully extended out from the first ramp platform 21, the trailing stop shoulder 22*f* of the second ramp platform 22 may be engaged with the leading stop shoulder 21*f* of the first ramp platform 21, and as the third ramp platform 23 is fully extended out from the second ramp platform 22, the trailing stop shoulder 23*g* of the third ramp platform 23 may be engaged with the leading stop shoulder 22*g* of the second ramp platform 22. When the trailing stop shoulder 22*f* of the second ramp platform 22 is engaged with the leading stop shoulder 21*f* of the first ramp platform 21 and the trailing stop shoulder 23*g* of the third ramp platform 23 is engaged with the leading stop shoulder 22*g* of the second ramp platform 22, a current applied to the motor 65 of the drive mechanism 60 may be higher than a threshold. Specifically, when the trailing stop shoulder 22*f* of the second ramp platform 22 is engaged with the leading stop shoulder 21*f* of the first ramp platform 21 and the trailing stop shoulder 23*g* of the third ramp platform 23 is engaged with the leading stop shoulder 22*g* of the second ramp platform 22, the controller may determine that the current applied to the motor 65 is higher than the threshold. When the current applied to the motor 65 is higher than the threshold, the controller may block the current applied to the motor 65 to thereby stop the motor 65.

When the second ramp platform 22 is fully extended out from the first ramp platform 21 and the third ramp platform 23 is fully extended out from the second ramp platform 22, the controller may determine that the first chain attachment 68 comes into contact with the trailing end portion of the slot 22C, and at the same time, that the trailing stop shoulder 22*f* of the second ramp platform 22 is engaged with the leading stop shoulder 21*f* of the first ramp platform 21 and the trailing stop shoulder 23*g* of the third ramp platform 23 is engaged with the leading stop shoulder 22*g* of the second ramp platform 22. Thus, the controller may determine that the current applied to the motor 65 is higher than the threshold, thereby stopping the motor 65 more accurately.

Referring to FIG. 32, the pair of drive mechanisms 60 may be disposed on the pair of opposing sidewalls of the second ramp platform 22, respectively. Accordingly, the pair of drive mechanisms 60 may oppose each other in a width direction of the second ramp platform 22. According to an exemplary embodiment, each drive mechanism 60 may have its own motor. According to another exemplary embodiment, the motor may be a dual shaft motor having two opposite output shafts, and each output shaft of the dual shaft motor may be directly fitted into the drive sprocket 61 of the corresponding drive mechanism 60. Each sidewall of the first ramp platform 21 may be connected to the first chain attachment 68 of the corresponding drive mechanism 60, and each sidewall of the third ramp platform 23 may be connected to the second chain attachment 69 of the corresponding drive mechanism 60. Accordingly, the second ramp platform 22 and the third ramp platform 23 may be configured to move telescopically by the pair of drive mechanisms 60. That is, the opposing sidewalls of the first ramp platform 21, the opposing sidewalls of the second ramp platform 22, and the opposing sidewalls of the third ramp platform 23 may form a pair of operation sections in which the pair of drive mechanisms 60 operate.

Referring to FIG. 32, the first ramp platform 21 may have a first recess 25 at least partially receiving the moving mechanism 40, and the first recess 25 may extend along the length of the first ramp platform 21. Accordingly, a mounting space of the moving mechanism 40 may be sufficiently secured in the housing 11, and the overall height (thickness) of the housing 11 may be minimized. The first ramp platform 21 may have increased stiffness using the first recess 25, and be prevented from twisting and sagging. In particular, the first recess 25 may extend along a central line of a top wall of the first ramp platform 21. The first recess 25 may be defined by a flat bottom wall 25*a* and a pair of inclined walls 25*b* connected to both sides of the bottom wall 25*a*, and accordingly the first recess 25 may have a V-shaped cross section.

Referring to FIG. 32, the second ramp platform 22 may have a second recess 26 which is complementary to the first recess 25 of the first ramp platform 21, and the second recess 26 may extend along the length of the second ramp platform 22. In particular, the second recess 26 may extend along a central line of a top wall of the second ramp platform 22. The second recess 26 may be defined by a flat bottom wall 26*a* and a pair of inclined walls 26*b* connected to both sides of the bottom wall 26*a*, and accordingly the second recess 26 may have a V-shaped cross section. The second ramp platform 22 may have increased stiffness using the second recess 26, and be prevented from twisting and sagging.

Referring to FIG. 32, the third ramp platform 23 may have a third recess 27 which is complementary to the second recess 26 of the second ramp platform 22, and the third recess 27 may extend along the length of the third ramp platform 23. In particular, the third recess 27 may extend along a central line of a top wall of the third ramp platform 23. The third recess 27 may be defined by a flat bottom wall 27*a* and a pair of inclined walls 27*b* connected to both sides of the bottom wall 27*a*, and accordingly the third recess 27 may have a V-shaped cross section. The third ramp platform 23 may have increased stiffness using the third recess 27, and be prevented from twisting and sagging.

Referring to FIG. 32, the second ramp platform 22 may have a bottom guide 26*c* protruding from the bottom wall 26*a* toward the third ramp platform 23, and the third ramp platform 23 may have two bottom guides 27*c* protruding from the bottom wall 27*a* toward the second ramp platform 22. The bottom guide 26*c* of the second ramp platform 22 may be interposed between the bottom guides 27*c* of the third ramp platform 23, and the movement of the third ramp platform 23 may be stably guided along the bottom guides 26*c* and 27*c* of the second ramp platform 22.

Figure 33:
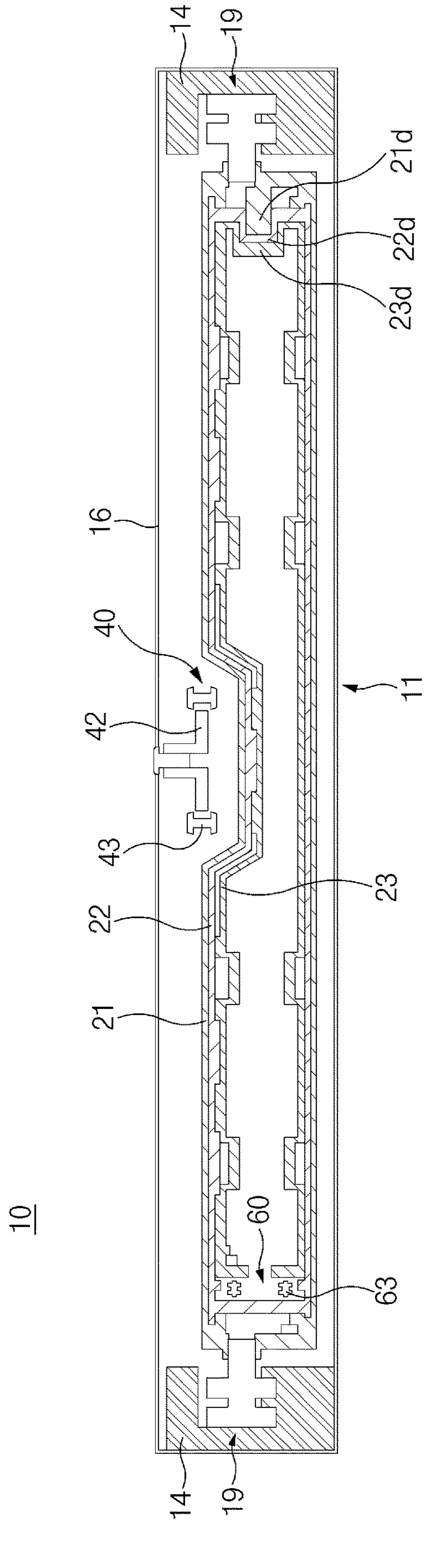
FIG. 33 illustrates a modification to the embodiment illustrated in FIG. 32.

FIG. 33 illustrates a modification to the embodiment illustrated in FIG. 32. Referring to FIG. 33, one drive mechanism 60 may be disposed on a first sidewall of the second ramp platform 22. A first sidewall of the first ramp platform 21 may be connected to the first chain attachment 68 of the drive mechanism 60, and a first sidewall of the third ramp platform 23 may be connected to the second chain attachment 69 of the drive mechanism 60. That is, the first sidewall of the first ramp platform 21, the first sidewall of the second ramp platform 22, and the first sidewall of the third ramp platform 23 may form an operation section in which the drive mechanism 60 operates. A second sidewall of the first ramp platform 21 may have a side guide 21*d*, a second sidewall of the second ramp platform 22 may have a side guide 22*d* guided with respect to the side guide 21*d* of the first ramp platform 21, and a second sidewall of the third ramp platform 23 may have a side guide 23*d* guided with respect to the side guide 22*d* of the second ramp platform 22. Accordingly, as the drive mechanism 60 operates, the second sidewall of the first ramp platform 21, the second sidewall of the second ramp platform 22, and the second sidewall of the third ramp platform 23 may form a guide section in which the second sidewalls of the ramp platforms are guided with respect to each other through the side guides 21*d*, 22*d*, and 23*d*. In addition, PTFE, bearings, LM guides, rollers and rails, and the like may be additionally mounted on the second sidewall of the first ramp platform 21, the second sidewall of the second ramp platform 22, and the second sidewall of the third ramp platform 23.

As the moving body 31 of the hinge mechanism 30 moves toward the leading end portion of the housing 11 by the moving mechanism 40, the ramp assembly 20 may be fully deployed from the housing 11. Referring to FIG. 6, when the chain stopper 49 comes into contact with the mounting bracket 46, the current applied to the motor 45 of the moving mechanism 4*o* may be higher than the threshold, and the controller may block the current applied to the motor 45 to thereby stop the motor 45. Thus, the moving body 31 may be prevented from being separated from the housing 11.

After the ramp assembly 20 is fully deployed from the housing 11, the ramp platforms of the ramp assembly 20 may be fully extended by the drive mechanism 60. That is, the second ramp platform 22 may be fully extended out from the first ramp platform 21, and the third ramp platform 23 may be fully extended out from the second ramp platform 22. When the second ramp platform 22 is fully extended out from the first ramp platform 21 and the third ramp platform 23 is fully extended out from the second ramp platform 22, the controller may determine that the first chain attachment 68 comes into contact with the trailing end portion of the slot 22C, and at the same time, that the trailing stop shoulder 22*f* of the second ramp platform 22 is engaged with the leading stop shoulder 21*f* of the first ramp platform 21 and the trailing stop shoulder 23*g* of the third ramp platform 23 is engaged with the leading stop shoulder 22*g* of the second ramp platform 22. Thus, the controller may determine that the current applied to the motor 65 is higher than the threshold, thereby stopping the motor 65 more accurately.

Figure 34:
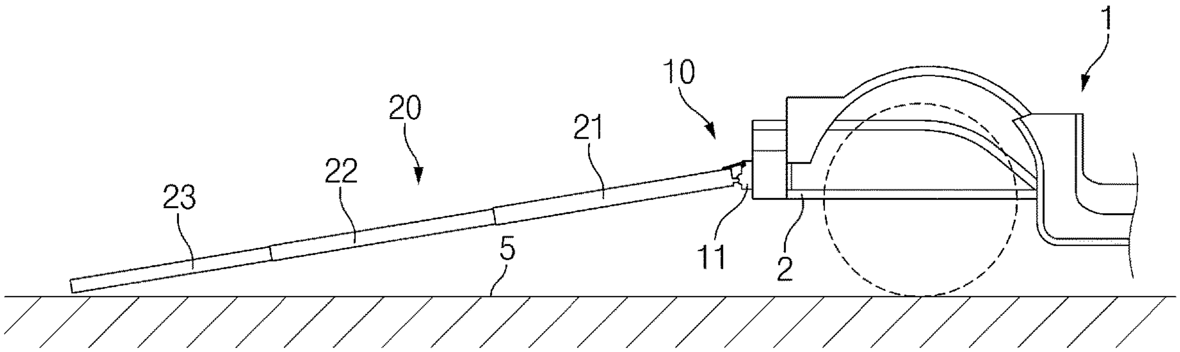
FIG. 34 illustrates a state in which a ramp assembly is deployed from a housing, ramp platforms are fully extended, and the ramp assembly is located in an inclined position in a ramp apparatus for a vehicle according to an exemplary embodiment of the present disclosure.

After the ramp platforms of the ramp assembly 20 are extended by the drive mechanism 60, the hinge drive unit 50 may rotate the hinge shaft 35 counterclockwise so that the ramp assembly 20 may move to the inclined position. As illustrated in FIG. 34, when the leading end portion of the third ramp platform 23 comes into contact with the ground 5, the current applied to the motor 51 of the hinge drive unit 50 may be higher than the threshold, and accordingly the controller may stop the motor 51.

Figure 35:
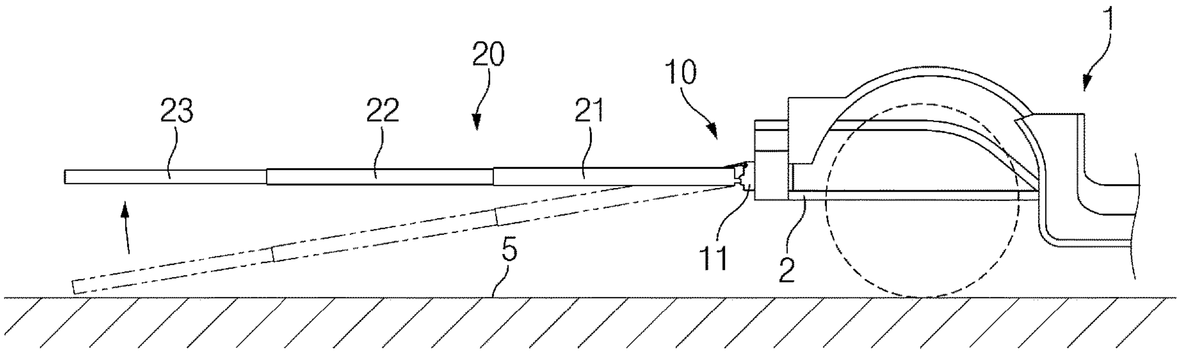
FIG. 35 illustrates a state in which a ramp assembly is deployed from a housing, ramp platforms are fully extended, and the ramp assembly is located in a horizontal position in a ramp apparatus for a vehicle according to an exemplary embodiment of the present disclosure.

Thereafter, the hinge drive unit 50 may rotate the hinge shaft 35 clockwise so that as illustrated in FIG. 35, the ramp assembly 20 may move to the horizontal position. Referring to FIG. 17, when the ramp assembly 20 moves to the horizontal position and the hinge stopper 39 comes into contact with the moving body 31 of the hinge mechanism 30, the current applied to the motor 51 of the hinge drive unit 50 may be higher than the threshold, and accordingly the controller may block the current applied to the motor 51 to thereby stop the motor 51.

Figure 36:
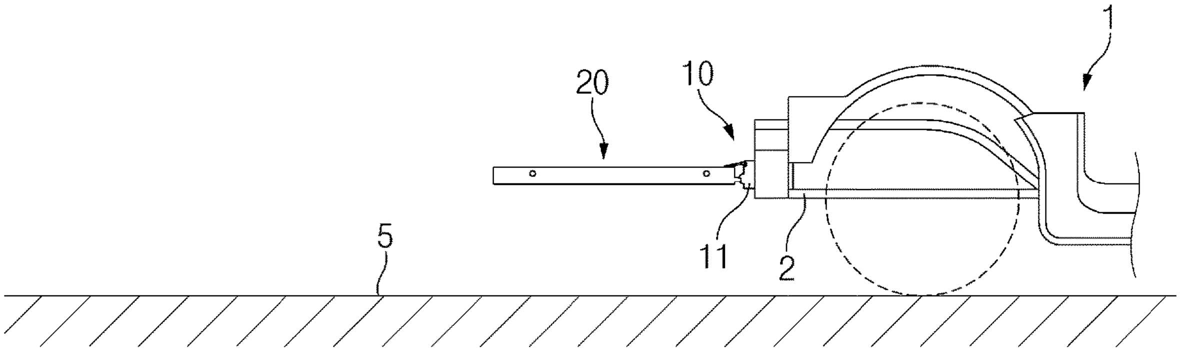
FIG. 36 illustrates a state in which a ramp assembly is deployed from a housing, ramp platforms are fully retracted, and the ramp assembly is located in a horizontal position in a ramp apparatus for a vehicle according to an exemplary embodiment of the present disclosure.

Then, the drive sprocket 61 may rotate counterclockwise by the motor 65, and accordingly the chain 63 may move in the same direction as the rotation direction of the drive sprocket 61. As illustrated in FIG. 36, the first chain attachment 68 may move toward the driven sprocket 62 by the movement of the chain 63, and the second ramp platform 22 may be stowed in the cavity of the first ramp platform 21 by a reaction to the movement of the first chain attachment 68. As the second chain attachment 69 moves toward the drive sprocket 61 by the movement of the chain 63, the third ramp platform 23 may move in the same direction as the movement direction of the second chain attachment 69, and accordingly the third ramp platform 23 may be stowed in the cavity of the second ramp platform 22.

When the second ramp platform 22 is fully stowed in the first ramp platform 21 and the third ramp platform 23 is fully stowed in the second ramp platform 22, the controller may determine that the first chain attachment 68 comes into contact with the leading end portion of the slot 22C. Accordingly, the controller may determine that the current applied to the motor 65 of the drive mechanism 60 is higher than the threshold, thereby stopping the motor 65 more accurately.

Figure 37:
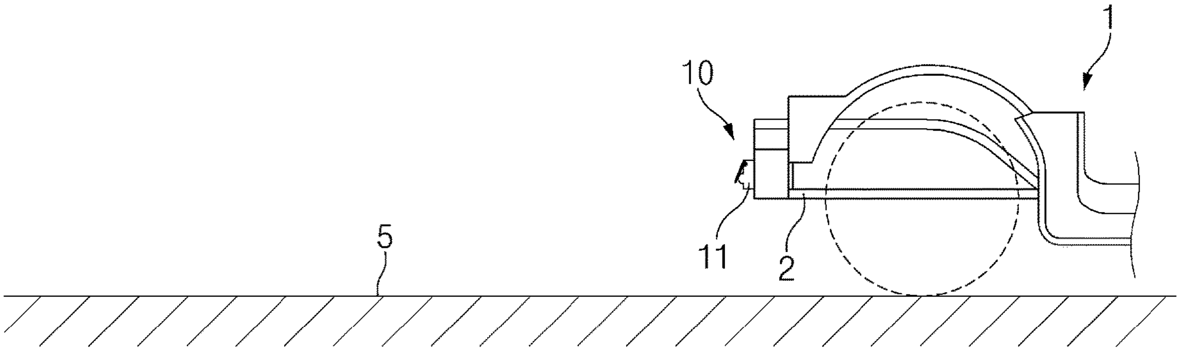
FIG. 37 illustrates a state in which a ramp assembly is stowed in a housing in a ramp apparatus for a vehicle according to an exemplary embodiment of the present disclosure.

As the moving body 31 of the hinge mechanism 30 is moved toward the trailing end portion of the housing 11 by the moving mechanism 40, the ramp assembly 20 may be fully stowed in the housing 11. Referring to FIG. 5, when the moving body 31 comes into contact with the stoppers 37, the current applied to the motor 45 of the moving mechanism 40 may be higher than the threshold, and accordingly the controller may block the current applied to the motor 45 to thereby stop the motor 45. Thus, the ramp assembly 20 may be fully stowed in the housing 11 (see FIG. 37).

As set forth above, according to exemplary embodiments of the present disclosure, the ramp assembly may be designed to allow the ramp platforms to be deployed/extended or retracted so that the overall deployment length of the ramp assembly may be relatively increased, and accordingly the slope of the ramp assembly may be relatively reduced.

According to exemplary embodiments of the present disclosure, the ramp assembly may be designed to be deployed from or stowed in the housing mounted on the vehicle body so that the storage space (stowage) of the ramp assembly may be optimized. By making the ramp apparatus compact, a sufficient battery mounting space may be secured.

According to exemplary embodiments of the present disclosure, the ramp assembly may be deployed from and stowed in the housing by the moving mechanism, and the telescopic ramp platforms may be extended and retracted by the drive mechanism so that the operation speed of the ramp apparatus may be significantly increased when the ramp platforms are extended and retracted.

According to exemplary embodiments of the present disclosure, the deployment length of the ramp assembly may be adjusted according to selective operations of the moving mechanism and the drive mechanism so that the ramp apparatus may be used for various purposes. For example, when only the moving mechanism and the hinge mechanism operate, the ramp assembly may be in the retracted state so that the length of the ramp assembly may be minimized, which allow the ramp assembly to be used in a state of being deployed short.

According to exemplary embodiments of the present disclosure, the motor of the moving mechanism, the motor of the hinge drive unit, and the motor of the drive mechanism may be controlled in an on/off manner so that the operation of the ramp apparatus may be performed very efficiently.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A ramp apparatus for a vehicle, the ramp apparatus comprising:

a housing mounted on a vehicle body;

a ramp assembly configured to move between a stowed position in which the ramp assembly is stowed in the housing and an extended position in which the ramp assembly is extended out from the housing, wherein the ramp assembly is configured to be moved telescopically to be extended and retracted;

a hinge mechanism configured to allow the ramp assembly to pivot when the ramp assembly is deployed from the housing, wherein the hinge mechanism comprises a moving body connected to the ramp assembly through a hinge shaft and a hinge drive unit mounted on the moving body; and a moving mechanism configured to allow the moving body to move, wherein the moving mechanism comprises a drive sprocket, a driven sprocket spaced apart from the drive sprocket, a chain connecting the drive sprocket and the driven sprocket, a first motor configured to drive the drive sprocket, and a chain attachment connecting the chain and the moving body, wherein the moving body is movable in the housing, wherein the hinge shaft is fixedly connected to the ramp assembly, and wherein the hinge drive unit is configured to rotate the hinge shaft.

2. The ramp apparatus according to claim 1, wherein the housing comprises a pair of guide rails mounted on opposing sidewalls of the housing, and the moving body comprises a plurality of guide rollers configured to roll along the pair of guide rails.

3. The ramp apparatus according to claim 1, wherein the drive sprocket is mounted in the housing through a mounting bracket having a U-shaped cross section defining a cavity.

4. The ramp apparatus according to claim 1, wherein the chain comprises a chain stopper spaced apart from the chain attachment and configured to contact a mounting bracket to limit movement of the moving body.

5. The ramp apparatus according to claim 1, wherein the hinge drive unit includes a second motor and a mounting bracket mounting the second motor on the moving body, and wherein the second motor has an output shaft fitted into the hinge shaft.

6. The ramp apparatus according to claim 1, wherein the ramp assembly includes a first ramp platform connected to the moving body through the hinge shaft, a second ramp platform telescopically connected to the first ramp platform, and a third ramp platform telescopically connected to the second ramp platform.

7. The ramp apparatus according to claim 6, wherein the hinge mechanism further comprises a hinge lug fixed to the first ramp platform, and wherein the hinge shaft is fitted into the hinge lug.

8. The ramp apparatus according to claim 7, further comprising a hinge stopper fixed to the hinge lug, wherein the hinge stopper contacts or is spaced apart from the moving body according to a rotation direction of the hinge shaft.

9. The ramp apparatus according to claim 6, further comprising a drive mechanism configured to allow the ramp platforms of the ramp assembly to be extended and retracted, wherein the drive mechanism is mounted on the second ramp platform, wherein the first ramp platform and the third ramp platform are operatively connected to the drive mechanism.

10. The ramp apparatus according to claim 9, wherein the drive mechanism includes a drive sprocket, a driven sprocket spaced apart from the drive sprocket, a chain connecting the drive sprocket and the driven sprocket, and a third motor configured to drive the drive sprocket.

11. The ramp apparatus according to claim 10, wherein the chain includes a first chain attachment, and a second chain attachment spaced apart from the first chain attachment, the first chain attachment is fixed to the first ramp platform, and the second chain attachment is fixed to the third ramp platform.

12. The ramp apparatus according to claim 11, wherein the second chain attachment has a projection fixed to the third ramp platform.

13. The ramp apparatus according to claim 11, wherein the first chain attachment has a projection fixed to the first ramp platform.

14. The ramp apparatus according to claim 13, wherein the second ramp platform has a slot provided in at least one sidewall thereof, and the projection of the first chain attachment is guided along the slot.

15. The ramp apparatus according to claim 6, wherein the first ramp platform has a first recess at least partially receiving the moving mechanism, and the first recess extends along a length of the first ramp platform.

16. The ramp apparatus according to claim 15, wherein the second ramp platform has a second recess which is complementary to the first recess of the first ramp platform, and the second recess extends along the length of the second ramp platform.

17. The ramp apparatus according to claim 16, wherein the third ramp platform has a third recess which is complementary to the second recess of the second ramp platform, and the third recess extends along the length of the third ramp platform.

18. The ramp apparatus according to claim 1, wherein the housing comprises a pair of stoppers configured to restrict a stowed position of the moving body.

19. The ramp apparatus according to claim 1, wherein the hinge drive unit comprises a second motor having a pair of output shafts extending from the second motor symmetrically.

20. The ramp apparatus according to claim 1, wherein the moving mechanism further comprises tension pulleys configured to guide movement of the chain and tension the chain.

* * * * *